(12) United States Patent
Pollard

(10) Patent No.: US 8,364,713 B2
(45) Date of Patent: *Jan. 29, 2013

(54) PERSONAL DATA MANAGER SYSTEMS AND METHODS

(75) Inventor: Stephen M. Pollard, London (GB)

(73) Assignee: Titanium Fire Ltd., London (GB)

( * ) Notice: Subject to any disclaimer, the term of this patent is extended or adjusted under 35 U.S.C. 154(b) by 290 days.

This patent is subject to a terminal disclaimer.

(21) Appl. No.: 12/356,504

(22) Filed: Jan. 20, 2009

(65) Prior Publication Data

US 2010/0185656 A1    Jul. 22, 2010

(51) Int. Cl.
*G06F 17/30* (2006.01)
(52) U.S. Cl. .............. 707/784; 726/4; 726/28; 705/44; 705/76
(58) Field of Classification Search ............... None
See application file for complete search history.

(56) References Cited

U.S. PATENT DOCUMENTS

| | | | |
|---|---|---|---|
| 5,623,637 A | 4/1997 | Jones et al. | |
| 5,892,900 A | 4/1999 | Ginter et al. | |
| 6,182,229 B1 | 1/2001 | Nielsen | |
| 6,192,380 B1 | 2/2001 | Light et al. | |
| 6,484,263 B1 | 11/2002 | Liu | |
| 6,633,915 B1 | 10/2003 | Hashimoto | |
| 6,687,362 B1* | 2/2004 | Lindquist et al. | 379/218.01 |
| 6,725,269 B1 | 4/2004 | Megiddo | |
| 6,947,959 B1* | 9/2005 | Gill | 715/202 |
| 7,136,490 B2 | 11/2006 | Martinez et al. | |
| 7,319,536 B1* | 1/2008 | Wilkins et al. | 358/1.15 |
| 2001/0027472 A1* | 10/2001 | Guan | 709/203 |
| 2002/0004783 A1 | 1/2002 | Paltenghe et al. | |
| 2002/0062342 A1 | 5/2002 | Sidles | |
| 2002/0078224 A1 | 6/2002 | Brueckner et al. | |
| 2002/0111946 A1 | 8/2002 | Fallon | |
| 2003/0041240 A1 | 2/2003 | Roskind et al. | |
| 2005/0183021 A1 | 8/2005 | Allen et al. | |
| 2005/0203885 A1 | 9/2005 | Chenevich et al. | |

(Continued)

FOREIGN PATENT DOCUMENTS

| | | |
|---|---|---|
| JP | 2002073455 A | 3/2002 |
| KR | 20000058580 A | 10/2000 |

(Continued)

OTHER PUBLICATIONS

Basney, Jim et al., "Credential Wallets: A Classification of Credential Repositories Highlighting MyProxy," 31st Research Conference on Communication, Information and Internet Policy (TPRC 2003), Sep. 19-21, 2003, Arlington, Virginia, 20 pages.

(Continued)

*Primary Examiner* — Tony Mahmoudi
*Assistant Examiner* — Michele Choi
(74) *Attorney, Agent, or Firm* — Lowe Graham Jones PLLC

(57) ABSTRACT

Methods and systems for facilitating the propagation of personal data include a Personal Data Propagation Environment ("PDP environment") that facilitates the propagation of personal data items between secure personal data stores and various consumers of the personal data items. One PDP environment includes a personal data manager and a personal data subscriber. The personal data manager manages personal data items on a secure data store associated with a user computing device. The personal data manager provides access to personal data items stored on the secure data store in accordance with a personal data subscription associated with the personal data subscriber.

32 Claims, 20 Drawing Sheets

U.S. PATENT DOCUMENTS

| | | | |
|---|---|---|---|
| 2005/0223242 A1* | 10/2005 | Nath | 713/193 |
| 2005/0234864 A1* | 10/2005 | Shapiro | 707/1 |
| 2006/0282662 A1 | 12/2006 | Witcomb | |
| 2007/0130463 A1 | 6/2007 | Law et al. | |
| 2007/0260751 A1 | 11/2007 | Meesseman | |
| 2007/0282790 A1 | 12/2007 | Goulko et al. | |
| 2008/0010298 A1 | 1/2008 | Steele et al. | |
| 2008/0140642 A1* | 6/2008 | Messing et al. | 707/5 |
| 2009/0024632 A1 | 1/2009 | Dheap et al. | |
| 2010/0042747 A1 | 2/2010 | Hascalovici et al. | |

FOREIGN PATENT DOCUMENTS

| | | | |
|---|---|---|---|
| KR | 20010087970 A | | 9/2001 |
| KR | 20010094145 A | | 10/2001 |
| KR | 20020003140 A | | 1/2002 |
| KR | 20040023216 A | | 3/2004 |
| KR | 20050099910 | * | 10/2005 |
| KR | 20050099910 A | | 10/2005 |
| WO | 2004025494 A1 | | 3/2004 |

OTHER PUBLICATIONS

"Introducing Windows CardSpace," http://msdn2.microsoft.com/en-us/library/aa480189(d=printer).aspx, retrieved Mar. 20, 2007, 17 pages.

"Password Safe," http://passwordsafe.sourceforge.net/index.shtml, retrieved Jun. 24, 2008, 2 pages.

"Using Privacy Features," http://www.mozilla.org/projects/security/pki/psm/help_21/using_priv_he . . . , retrieved Jun. 24, 2008, 16 pages.

Microsoft Press; Computer Dictionary, "Definition of Access Control List"; Third Edition; Published by Microsoft Press, A Division of Microsoft Corporation, One Microsoft Way, Redmond, Washington 98052-6399; Copyright 1997; 3 pages.

Korean Intellectual Property Office; International Search Report for International Application No. PCT/US2010/021434; completed on Jul. 27, 2010 and mailed on Jul. 28, 2010; Form PCT/ISA/210; 4 pages.

Korean Intellectual Property Office; International Search Report for International Application No. PCT/US2010/021435; completed on Aug. 25, 2010 and mailed on Aug. 25, 2010; Form PCT/ISA/210; 3 pages.

Korean Intellectual Property Office; International Search Report for International Application No. PCT/US2010/021436; completed on Aug. 25, 2010 and mailed on Aug. 25, 2010; Form PCT/ISA/210; 3 pages.

Houghton Mifflin Company, Second College Edition The American Heritage Dictionary, Copyright 1982, 1985, 1991, 3 pages, Published by Houghton Mifflin Company, 2 Park Street, Boston, MA 02108.

MERRIAM-WEBSTER.COM, Accord—Definition, Printed Jul. 29, 2010, 2 pages, http://www.merriam-webster.com/dictionary/accord.

* cited by examiner

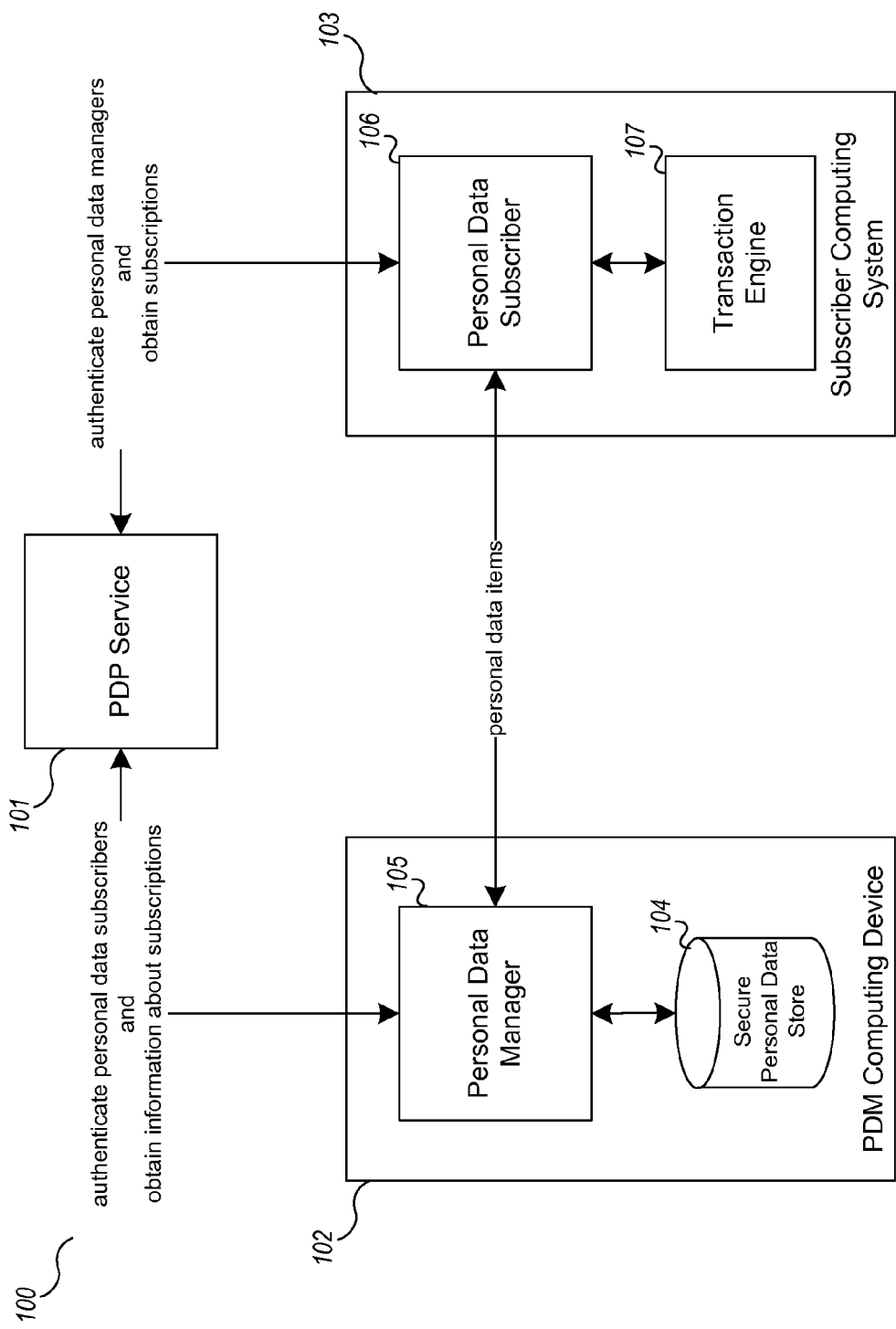

ACME Bank Account Creation

The following personal information is required:

- First Name: Jane
- Given Name: Doe
- Date of Birth: 01/01/1980
- Phone Number: +1-333-555-1212
- E-mail address: jane.doe@...

- Street Address: 123 Easy Street
- City: Sometown
- Postal Code: 1234
- Country: Somecountry

Contact Preferences: — 213
- Post: ☒
- E-mail: ☐
- Phone: ☒

The following financial information is required:

- Credit Card No: XXXX-XXXX-XXXX-1234
- Credit Card Type: SomeCreditCardType
- Expiration: 06/2010
- Security Code: XXXXX ☐ I agree to the <u>Terms and Conditions</u> — 214

[Create Account] — 215    [Cancel]

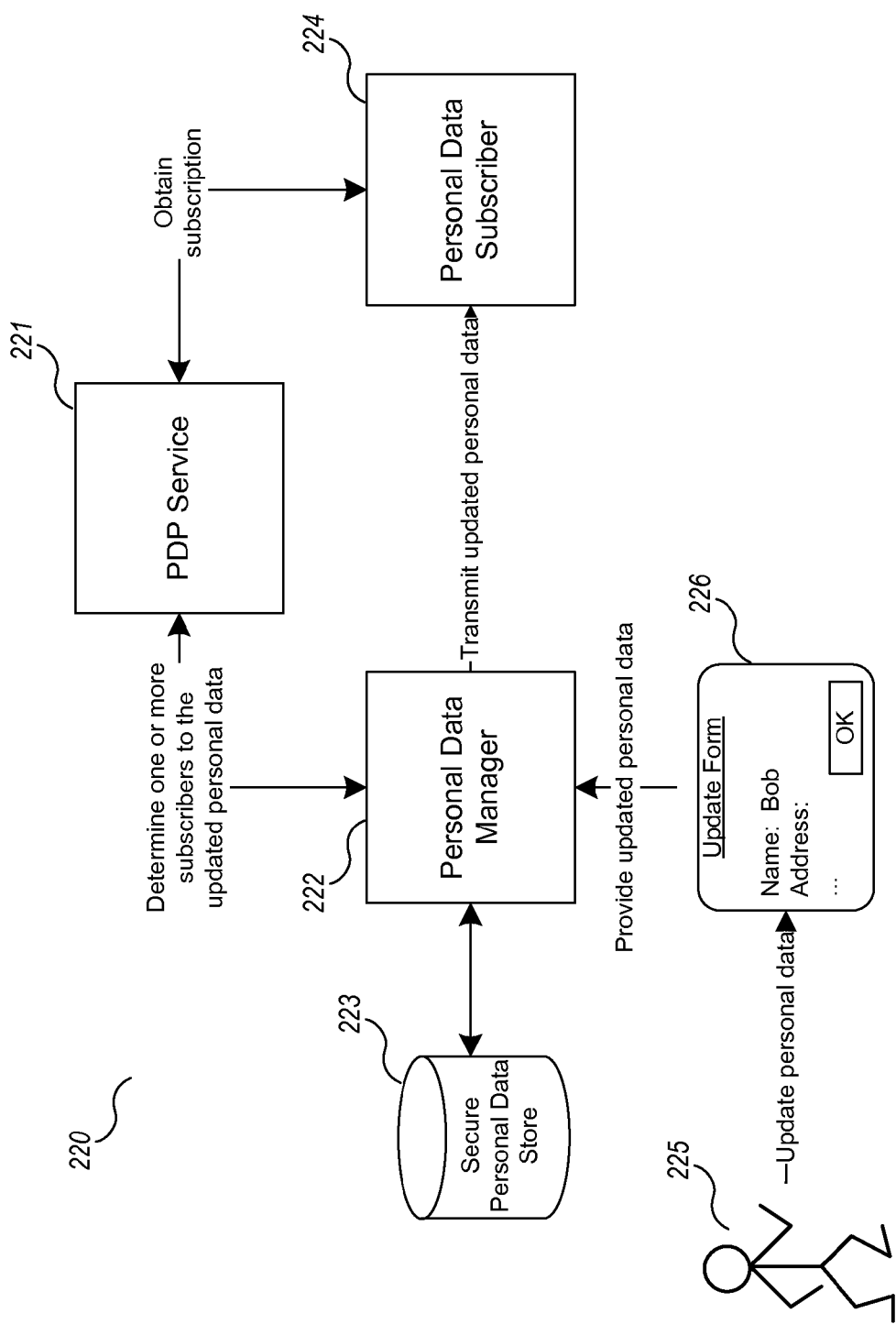

ACME Bank Account Update

Since your last visit, the following information has changed:

New Phone Number: [ +1-333-555-9999 ] — 241

New Contact Preferences:
- Post: ☐
- E-mail: ☒
- Phone: ☒

242

Changes to the <u>Terms and Conditions</u> ☒ — 243

[ Update Account ] — 244    [ Later ]

ACME
Bank
LOGO — 245

TO CREATE AN ACCOUNT, THE FOLLOWING INFORMATION IS REQUIRED:

| First Name | Jane |
|---|---|
| Given Name | Doe |
| Date Of Birth | 01/01/1980 |
| E-mail (Home) | jane.doe@xxx.com |

Address ▼
<Address>

IDENTITY INFORMATION

| Credit Card Type ▼ | XXXXXXXX2345 |
|---|---|
| Valid Dates | 01/01/2008 |
| Security Code | XXXXXXXX2345 |

Address ▼
<Address>

FINANCIAL INFORMATION

| E-mail | No ▼ |
|---|---|
| Telephone | Yes ▼ |
| Post | No ▼ |

CONTACT PREFERENCE INFORMATION

THE FOLLOWING INFORMATION WILL BE STORED ON YOUR DEVICE:

| Customer Number | READ / ONLY |
|---|---|
| HELPLINE | READ / ONLY |
| Company Logo | READ / ONLY |

Direct Login Button

Transaction Table

| Transaction | DATE | URL | OTHER |
|---|---|---|---|
| Transaction | DATE | URL | OTHER |
| Transaction | DATE | URL | OTHER |
| Transaction | DATE | URL | OTHER |

SUBSCRIBER DATA CREATED

Terms & Conditions (V1.0)  
www.website.com

ACCEPT | REJECT

*Fig. 2F*

PERSONAL DATA MANAGER SYSTEMS AND METHODS

TECHNICAL FIELD

The present disclosure relates to methods and systems for facilitating personal data propagation and, in particular, to methods and systems for propagating personal data items between personal data managers and personal data subscribers.

BACKGROUND

A typical computer user may interact with many distinct online resources, such as Web sites or other network-accessible information and/or service providers. These online resources typically provide access to various services, such as shopping, banking, travel, news, etc. In order to better manage the user experience, many online resources will require a user to establish a user account that includes personal information about the user, such as name, shipping address, billing address, billing information, etc. A number of approaches exist for the management of personal information. Each approach suffers drawbacks, especially when coping with personal information that changes over time.

In one approach, personal information used for a particular online resource is managed by the online resource itself. In this approach, the personal information for a particular user is stored by the online resource in a user account that may be protected by a username and/or password. Generally, the user can access and update the personal information by providing the appropriate username and password. The principal drawback with this approach to the management of personal information is that it does not scale well. In particular, the number of user accounts increases with the number of online resources utilized by the user. And, as the number of user accounts increases, so does the corresponding effort required for the user to manage them. For example, when the user's physical address changes (e.g., because the user has moved to a different residence), the user must visit multiple online resources and update his personal information in multiple separate user accounts. In addition, each online resource will typically provide a different user interface for accessing and updating personal information, thereby further making the process time consuming and frustrating for the user.

In another approach, personal information for a particular user is stored in a centrally accessible data repository, such as a server-based "wallet" or "passport" managed by a third party. In this approach, when an online resource requires access to personal information about a user, the online resource communicates with the third party and requests the required information. The principal drawback with this approach is that many users may be hesitant or unwilling to put some or all of their personal information in the hands of a third party. In addition, users may not have fine-grained control over what kinds of personal information are released to a particular online resource, because the user may not be involved with, or even aware of, the transmission of personal information from the third party to the online resource.

In a third approach, personal information for a particular user is stored on the user's computing system. For example, a password manager in a Web browser or other client application may store the user names and passwords for a user, such that they can be transmitted to an online resource upon request. One drawback of this approach is that it is typically directed only to very limited types of personal information, such as user names and passwords. Other types of personal information are typically still managed by the online resources themselves, meaning that the user is still faced with many of the problems related to the first approach, described above.

BRIEF DESCRIPTION OF THE DRAWINGS

FIG. 1 is an example block diagram of components of an example Personal Data Propagation Environment.

FIGS. 2A-2K are example block diagrams and screen displays illustrating example aspects of example personal data propagation processes.

DETAILED DESCRIPTION

Figure 2A:
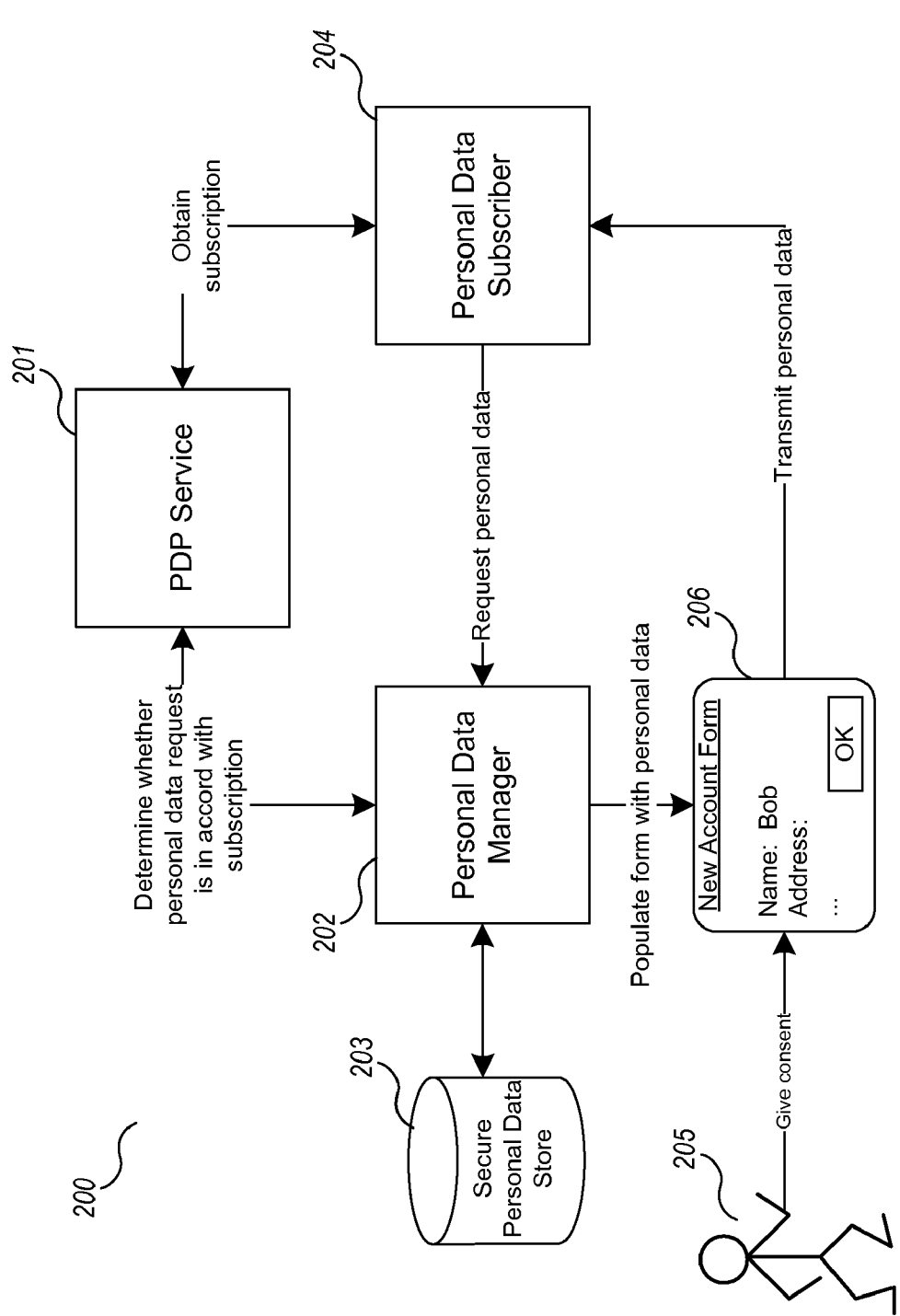

Embodiments described herein provide enhanced computer- and network-based methods, techniques, and systems for facilitating the propagation of personal data. Example embodiments provide a Personal Data Propagation Environment ("PDP environment"), which enables users to efficiently manage personal data items stored on secure personal data stores. Personal data items include data records and/or data structures that reflect personal information about or related to a particular user, including personally identifying information (e.g., name, date of birth), financial information (e.g., bank account numbers, credit card numbers), location information (e.g., home address, GPS coordinates of current location), contact information (e.g., postal addresses, telephone numbers, e-mail addresses), Web/Internet information (e.g., login history, browsing history, cookies, public/private keys) and the like. In addition, the PDP environment facilitates the propagation of such personal data items between the secure personal data stores on which they are stored and various consumers and/or users of the personal data items, such as electronic commerce computing systems, institutional computing systems, government computing systems, etc.

The propagation of personal data items includes the unidirectional or bidirectional transmission of personal data items between a secure personal data store and a remote computing system. Thus, propagation of personal data items includes the transmission of personal data items from the secure personal data store to the remote computing system and/or the transmission of personal data items from the remote computing system to the secure personal data store. Personal data items may be stored in the secure personal data store and/or on the remote computing system. In at least some embodiments, access to personal data items stored in a secure personal data store is regulated by way of personal data subscriptions that entitle consumers of personal data items to access one or more personal data items stored in the secure personal data store.

FIG. 1 is an example block diagram of components of an example Personal Data Propagation Environment. In particular, FIG. 1 depicts an example Personal Data Propagation Environment ("PDP environment" or "PDPE") 100 that includes a Personal Data Propagation Service ("PDP service" or "PDPS") 101 (e.g., a code module/component), a Personal Data Manager ("PDM") computing device 102, and a Personal Data Subscriber ("PDS") computing system 103. The PDM computing device 102 includes a Personal Data Manager ("PDM") 105 (e.g., a code module/component) and a secure personal data store 104. The PDS computing system 103 includes a Personal Data Subscriber ("PDS") 106 (e.g., a code module/component) and a transaction engine 107.

The components of the illustrated PDPE 100 provide various functions and/or services related to the propagation of personal data between user devices, such as the PDM computing device 102 and one or more personal data subscribers, such as the PDS computing system 103. In particular, the PDP service 101 provides functions related to the overall management of the PDP environment 100, such as authentication services and personal data subscription management functions. For example, the PDS 106 may obtain a personal data subscription (referred to also as "a subscription") from the PDP service 101, the personal data subscription entitling the PDS 106 access to one or more personal data items stored on the secure personal data store 104. As noted, personal data items include data records and/or data structures that reflect personal information about or related to a particular user. Table 1, below, provides additional information about various example types of personal data that may be represented in an example PDP environment. In addition, in the course of an interaction between the PDM 105 and the PDS 106, the PDP service 101 may authenticate the PDM 105 to the PDS 106, and vice versa. The PDP service 101 may provide other functions, such as answering queries about personal data subscriptions (e.g., received from personal data managers), distributing information about personal data subscriptions (e.g., to personal data managers), managing the distribution of secure personal data stores 104, distributing software updates (e.g., to the PDM 105 and/or the PDS 106), etc.

Personal data subscriptions may be represented in a variety of ways. In one embodiment, a personal data subscription may include a collection (e.g., a list, array, table, set, or similar data structure) of indications of one or more personal data items to which the personal data subscription entitles access or control. In another embodiment, a personal data subscription may include one or more categories, classes, or types of personal data items, where the categories are defined elsewhere to specify the particular personal data items (or other categories, types, or classes) they include. Personal data subscriptions may also include access rights, possibly in association with particular personal data items. For example, a personal data subscription may specify that the subscription entitles its holder to perform various kinds of operations, such as reading (e.g., retrieval), writing (e.g., storage), and/or executing, with respect to a particular personal data item or category thereof. In some embodiments, personal data subscribers may subscribe to or otherwise become associated with a "level of service," which may be or include one or more subscriptions to one or more personal data items accessible from one or more personal data managers.

In at least some embodiments, subscriptions may be obtained by personal data subscribers in exchange for payment or other consideration to a personal data propagation service or other party. Furthermore, different payment levels may be based on various factors, such as the specific kinds of personal data items, particular types of allowed operations (e.g., read, write, distribute, share), etc. For example, a subscription that provides read-only access to personal data items related to personal interests (e.g., preferred hobbies, sports, leisure activities) may have a lower price than a subscription that provides read-write access to personal data items related to financial information (e.g., bank account numbers, bank balances). In some embodiments, each kind of personal data item may include one or more associated prices, such that the price of a personal data subscription to one or more personal data items may be based on an aggregate of the prices associated with the one or more personal data items.

The PDM 105 manages personal data items that are stored on the secure personal data store 104. For example, the PDM 105 may provide user interface functionality which may be utilized by an end user, such as a consumer of goods and/or services, in order to manage (e.g., add, update, delete) personal data items stored in the secure personal data store 104. In addition, the PDM 105 may provide controlled access to the personal data items stored in the secure personal data store 104 to an external entity, such as the PDS 106, by assuring that requests for personal data are in accordance with a personal data subscription associated with the external entity. For example, the PDS 106 may request one or more personal data items from the PDM 105. In response, the PDM 105 may determine whether access by the PDS 106 is in accord with a personal data subscription associated with the PDS 106. To do so, the PDM may interact (e.g., communicate, cooperate, utilize) with the PDP service 101, such as by transmitting to the PDP service 101 an indication of the PDS 106 and of the one or more data items requested by the PDS 106, and receiving from the PDP service 101 an indication of whether or not access to the requested personal data items is in accord with a personal data subscription associated with the PDS 106. In an embodiment where the PDS 106 is associated with a particular "level of service," the PDM 105, possibly in cooperation with the PDP service 101, may determine whether the level of service entitles the PDS 106 to access the requested personal data items. If the request is determined to be in accord with the personal data subscription associated with the PDS 106, the PDM 105 forwards (e.g., transmits, sends) the requested personal data items to the PDS 106.

In addition, data items may be transmitted from a personal data subscriber to a personal data manager, for storage as personal data items on a secure personal data store. For example, the PDS 106 may request that the PDM 105 store one or more data items on the secure personal data store 104. Upon receiving the request, the PDM 105 may interact with the PDP service 101 to determine whether the request is in accord with a personal data subscription associated with the PDS 106. If the request is determined to be in accord with a personal data subscription associated with the PDS 106, the PDM 105 forwards the one or more data items to the secure personal data store 104 for storage thereon as personal data items.

The secure personal data store 104 is communicatively coupled to the PDM 105 and provides a secure storage facility for personal data items. For example, the secure personal data store 104 may be a non-volatile memory, such as flash memory, that is embedded in, or coupled to, the PDM computing device 102. In some embodiments, the secure personal data store 104 may be removably coupled to the PDM computing device 102, such as a USB memory stick or similar storage device. Personal data items stored on the secure personal data store 104 are typically encrypted based on a password, passphrase, personal identification number, biometric identifier, and/or other factor(s) known to, or otherwise associated with, a user of the PDM computing device 102. Various known or proprietary encryption techniques may be utilized, such as AES, DES, Rijndael, Blowfish, Twofish, RC-variants (e.g., RC2, RC4, RC5, RC6), etc.

Note that one or more personal data managers, one or more secure personal data stores, and one or more user identities may be combined in various ways. In one example, a particular personal data manager may interact with multiple secure personal data stores. For example, a single home computer may execute a personal data manager that operates upon multiple secure personal data stores that are each associated with, for example, a different member of a family. In another example, a user may utilize multiple secure personal data stores to represent multiple distinct identities or "personas," such as an "employee account" persona, a "personal account" persona, a "contractor account" persona, etc. In a third example, multiple user personas may be represented on a single secure personal data store. In a fourth example, a user may utilize one or more secure personal data stores with multiple personal data managers. For example, when going to his place of employment, the user may decouple his secure personal data store from his home computer, couple it with a mobile computer (e.g., laptop, smart phone, personal digital assistant) for use during his commute, and then later couple it with a desktop computer at his office. In this example, the home computer, mobile computer, and workplace desktop computer all execute a different instance of a personal data manager.

The PDS 106 manages the acquisition of personal data subscriptions from the PDP service 101 and the propagation of personal data items to/from the PDM 105 on behalf of some consumer and/or user (human and/or electronic) of personal data, such as the transaction engine 107. The transaction engine 107 may be any electronic transaction system (e.g., an electronic merchant that provides goods and/or services possibly in exchange for a fee). Example transaction engines include online retailers, financial institutions (e.g., banks, credit unions), government agencies/departments (e.g., social services agencies, tax and/or revenue departments), educational institutions, charitable institutions, auctions, etc.

In addition, in some embodiments, the user may be compensated for providing access to one or more personal data items to personal data subscribers. For example, in exchange for payment, the user may allow access to his transaction history or Web history to personal data subscribers that utilize the information for marketing purposes.

Different architectural arrangements than the one illustrated are contemplated. For example, although the transaction engine 107 is illustrated as part of the PDS computing system 103, it may be part of a separate and distinct computing system from the one executing the PDS 106. In other embodiments, the PDM 105 and/or the secure personal data store 104 may actually be remote from the PDM computing device 102, such as by being located with the PDP service 101.

Figure 2D:
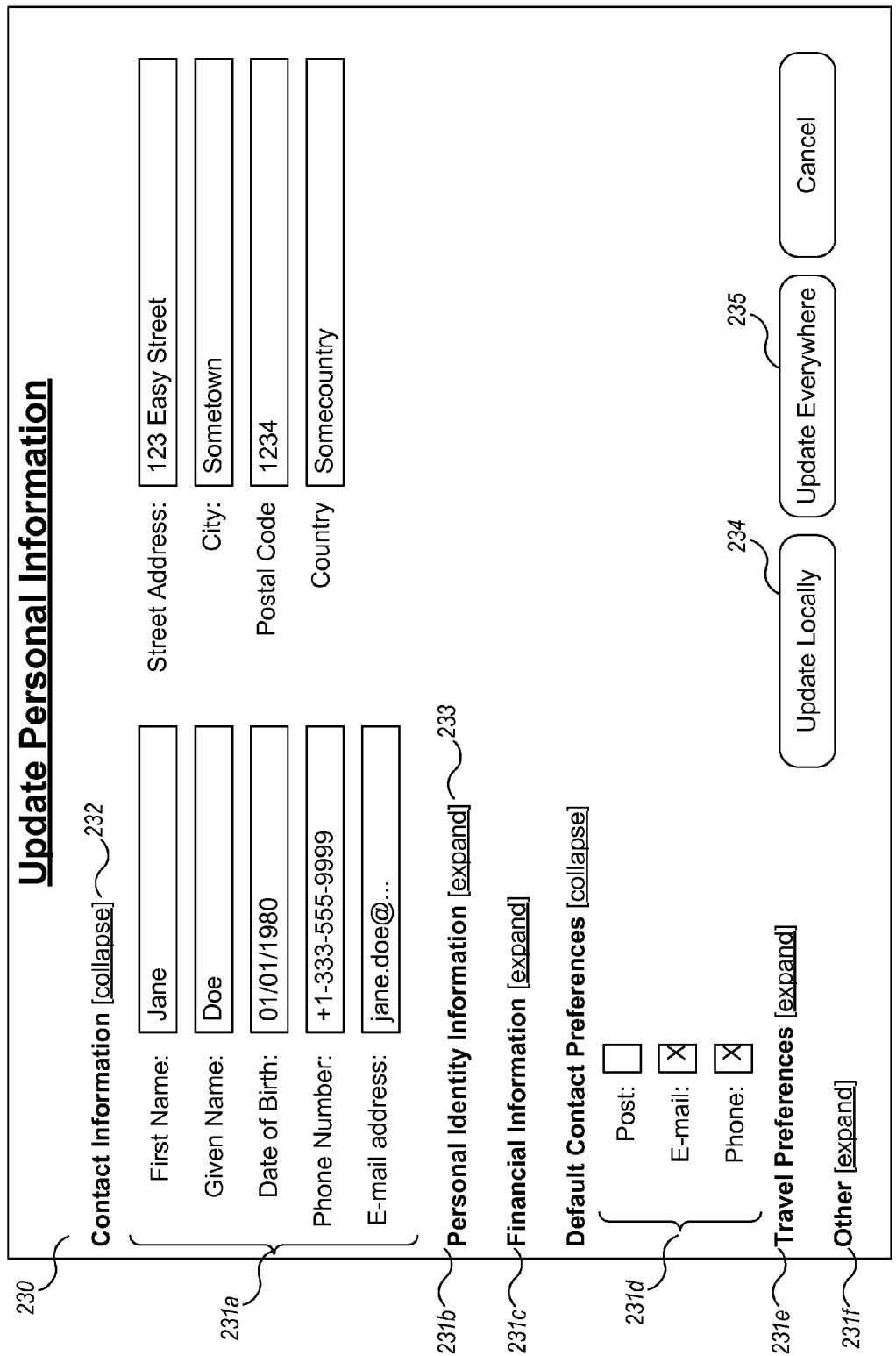

FIGS. 2A-2K are example block diagrams and screen displays illustrating example aspects of example personal data propagation processes. In particular, FIGS. 2A-2B illustrate a personal data propagation process in the context of a user creating a new account with some electronic transaction system, such as may be operated by a bank (e.g., a banking Web site), an electronic merchant (e.g., a Web site providing an electronic storefront), etc. FIGS. 2C-2E illustrate two schemes for personal data propagation in the context of a user updating personal data items stored in a secure personal data store.

FIG. 2A is an example block diagram illustrating interactions between components of an example Personal Data Propagation Environment. In particular, FIG. 2A shows a PDP environment 200 that is similar to the PDP environment 100 discussed with reference to FIG. 1, except that some components have been omitted for clarity, and other aspects are included, such as additional descriptions of data flows and user interface controls. The PDP environment 200 includes a PDP service 201, a PDM 202, a secure personal data store 203, and a PDS 204, which are similar to the PDP service 101, the PDM 105, the secure personal data store 104, and the PDS 106, respectively, described with reference to FIG. 1.

In the example of FIG. 2A, a user 205 is in the process of establishing a new account with a bank. The user 205 may do so by operating a user interface, such as may be provided by a Web browser (not shown) that displays a new account form 206 provided by a Web site operated by, or on behalf of, the bank. The bank in this example subscribes to personal data of new and returning customers by operating or being otherwise associated with the PDS 204. Previously, the PDS 204 has obtained a personal data subscription from the PDP service 201, which entitles the PDS 204 to access various types of personal data from a user's secure data store. In this example, such a personal data subscription may include personally identifying information (e.g., name, date of birth, social security number), contact information (e.g., physical address, e-mail address, telephone number), financial information (e.g., bank account numbers, credit card numbers, tax identifiers), etc. In obtaining such a personal data subscription, the PDP service 201 generates (and stores) an association between the PDS 204 and the obtained subscription.

Initially, the user indicates a desire to initiate the account creation process via the new account form 206, or a related action, such as selecting a user interface control (e.g., a link, button) to create a new account. In response, an authenticated, secure communication link between the PDM 202 and PDS 204 is established, possibly with the assistance of the PDP service 201. For example, the PDP service 201 may be utilized by the PDM 202 and the PDS 204 to authenticate the PDM 202 to the PDS 204, and vice versa. Then, the PDS 204 uses the secure communication link to transmit a personal data request for one or more items of personal data, such as the user's name, contact information, and various types of financial information.

Next, the PDM 202 determines whether the received personal data request is in accord with a personal data subscription associated with the PDS 204. In the illustrated example, the PDM 202 utilizes the PDP service 201 to make this determination. For example, the PDM 202 may transmit to the PDP service 201 a request that includes details related to the personal data request (e.g., a list of requested personal data items) along with an identifier of the PDS 204. In response, the PDP service 201 may transmit to the PDM 202 a response indicating that the PDS 204 is (or is not) associated with a subscription that entitles the PDS 204 to access the requested personal data items. In other embodiments, the PDM 202 may have previously received from the PDP service 201 and stored (e.g., cached) information about various personal data subscribers and their associated subscriptions. In such cases, the determination of the propriety of the personal data request may be made by the PDM 202 locally, without an intervening interaction with the PDP service 201. Because such a determination may in some circumstances be out of date with respect to the current details of a subscription managed by the PDP service 201, various embodiments may employ various approaches in such circumstances. In one embodiment, the user may at least be notified that a local determination may be out of date and/or provided the option to deny the PDS 204 access to one or more of the requested personal data items. In another embodiment, the user may be able to specify which, if any, personal data items managed by the PDM 202 may be accessed based on local determinations of the propriety of personal data requests. For example, the user may specify that less sensitive personal data items may be accessed based on a local determination, whereas more sensitive personal data items may only be accessed based on an interaction with the PDP service 201. In other embodiments, a user may specify a "refresh" interval that specifies a maximum amount of time during which local determinations may be made before current subscription information should be obtained from the PDP service 201.

If the PDM 202 determines that the received personal data request is in accord with a personal data subscription associated with the PDS 204, the PDM 202 automatically populates the new account form 206 with the requested personal data, as stored in the secure personal data store 203. Then, the user 205 indicates that he or she consents to releasing the personal data on the new account form 206 to the PDS 204. In response, the personal data is transmitted to the PDS 204, and utilized there, or by a transaction engine for the creation of a new account.

Note that although FIG. 2A depicts particular data flows, such data flows may occur with varying levels of indirection in other embodiments. For example, the personal data request may be forwarded to the PDM 202 via the new account form 206, such that the PDS 204 interacts indirectly with the PDM 202. In another embodiment, the transmission of personal data may occur directly between the PDM 202 and the PDS 204, rather than indirectly via the new account form 206.

Note also that other functions may be performed as part of, or in addition to, the example illustrated in FIG. 2A. For example, as part of the described account creation process, the PDS 204 may transmit one or more data items to the PDM 202 for storage as personal data items in the secure personal data store 203. Such personal data items may include, for example, an initial account balance, an account number, a telephone number (e.g., for banking help or customer support), a URL (e.g., specifying the Web site of the bank), branding information (e.g., a bank or Web site logo), etc.

FIG. 2B depicts a new account form 210 that may be used to establish a new account in the example scenario of FIG. 2A. The new account form 210 may be displayed as, for example, a Web page in a Web browser, a stand-alone form or graphical overlay, dialog box, or window associated with an application having a graphical user interface, or a screen in a text-based application. In one embodiment, form 210 is part of a "dashboard" interface provided by the PDM 202. The new account form 210 includes a personal information section 211, a financial information section 212, a contact preferences section 213, a terms and conditions section 214, and an account creation control 215. The personal information section 211 includes multiple input fields for specifying various types of personal information about a user, including first or given name, last or surname, date of birth, phone number, physical address, and e-mail address. In some embodiments, a control may be provided that allows the user to select one or more of multiple valid addresses (e.g., home and work address) or other contact information (e.g., work and personal e-mail addresses, work and personal telephone numbers). The financial information section 212 includes multiple input fields for specifying details related to a credit card held by the user. The contact preferences section 213 may be utilized to specify one or more preferred communication mechanisms, such as postal mail, e-mail, and/or telephone. The terms and conditions section 214 may display, or provide a user interface control (e.g., a link) to initiate display of, terms and conditions related to the account. The terms and conditions related to the account may be stored by the PDM 202 in the secure personal data store 203. Note that other information obtained from the PDS 204 may also be stored in the secure personal data store 203, such as branding information (e.g., a personal logo), a new account number, etc. In addition, the terms and conditions section 214 may be used by the user to manifest assent to the included terms and conditions, such as by checking a box or otherwise indicating agreement.

As noted with reference to FIG. 2A, at least some of the input controls of the new account form 210 are automatically populated by the PDM 202. For example, as shown in FIG. 2B, fields in the personal information section 211, the financial information section 212, and the contact preferences section 213 are automatically populated based on the personal data request received from the PDS 204, the actual contents of the secure personal data store 203, and/or the requirements of the new account form 210 itself. Note that at least some displayed information may be obtained from the PDS 204. For example, the terms and conditions of the terms and conditions section 214 may be obtained as part of the personal data request received from the PDS 204, or obtained as part of a separate communication with the PDS 204.

After the user has had an opportunity to review and possibly modify the contents of the new account form 210, the user may select the account creation control 215. In response, the personal data included in the new account form 210 is transmitted to the PDS 204 for use in some transaction, such as the creation of a new account associated with the user. If the user modifies any of the contents of the new account form 210, the modified information may also be propagated back to the PDM 202, such that the corresponding personal data items stored in the secure personal data store 203 may be updated. For example, the user may adjust a contact preference in the contact preferences section 213 by deselecting the e-mail preference, as illustrated. In addition to transmitting the adjusted contact preferences to the PDS 204, the PDM 202 may take one or more actions in response to the adjustment of the contact preferences. For example, the PDM 202 may store the updated information in the secure personal data store 203, possibly after querying the user whether he or she desires that the updated information be stored for future interactions with the PDS 204 and/or other personal data subscribers. Furthermore, the PDM 202 may automatically propagate the updated information to other personal data subscribers, as will be described with reference to FIGS. 2C and 2D, below.

FIG. 2C is an example block diagram illustrating interactions between components of an example Personal Data Propagation environment. In particular, FIG. 2C shows a PDP environment 220 that is similar to the PDP environment 100 discussed with reference to FIG. 1, except that some components have been omitted for clarity, and other aspects are included, such as descriptions of data flows and user interface controls. The PDP environment 220 includes a PDP service 221, a PDM 222, a secure personal data store 223, and a PDS 224, which are similar to the PDP service 101, the PDM 105, the secure personal data store 104, and the PDS 106, respectively, described with reference to FIG. 1.

In the example of FIG. 2C, a user 225 is in the process of updating personal information stored in a secure personal data store. The user 225 may do so by operating a user interface, such as may be provided by a Web browser (not shown) or other client application that displays an update form 226 (or equivalent user interface). The user 225 interacts with the update form 226 to modify or otherwise adjust one or more personal data items, such as a telephone number, residence address, bank account number, contact preference, etc. In response, the PDM 222 stores the updated personal data items in the secure personal data store 223.

The PDM 222 then automatically propagates the updated personal data items to one or more personal data subscribers that have previously obtained subscriptions to the updated personal data items. This type of automatic propagation may in some embodiments automatically synchronize, without any intervening actions by a user of the PDM 222, updated personal data items between the PDM 222 and one or more personal data subscribers. At least two approaches for propagating updated personal data items are contemplated. In a first approach, the updated personal data items are "actively" propagated, or "pushed," to one or more subscribers to the updated personal data items. For example, in response to the user's update of the personal data items, the PDM 222 automatically determines one or more subscribers to the updated personal data items, and then transmits the updated personal data items to each of the subscribers, such as the PDS 224. The determination of subscribers may be made by interacting with the PDP service 221 and/or with reference to previously stored (e.g., cached) information about which subscribers have subscribed to the updated personal data items.

In a second approach, the updated personal data items are "lazily" or "passively" propagated from the PDM 222 to personal data subscribers that have subscribed to the updated personal data items, such as the PDS 224. For example, the updated personal data items may be transmitted to the PDS 224 during some future interaction, such as when the user 225 performs some other interaction with the PDS 224, such as checking an account balance, initiating an account transfer, purchasing a good, etc. The PDM 222 may determine that updated personal data items need to be transmitted to the PDS 224 in various ways. For example, the update to the personal data items may be time stamped, such that the PDM 222 can determine that an update to personal data items has occurred more recently than the most recent previous interaction with the PDS 224, meaning that the personal data items stored in the secure personal data store 223 are likely out of date with respect to corresponding personal data items stored by the PDS 224. Alternatively, the PDS 224 may request, on all or some types of interactions, that the PDM 222 transmit all current personal data items to which the PDS 224 has subscribed.

FIG. 2D depicts a personal data update form that may be used by a user to update personal data stored in a secure personal data store, and possibly to propagate the updated personal data to one or more personal data subscribers. The personal data update user interface (e.g., form) 230 may be displayed as, for example, a Web page in a Web browser, a stand-alone form associated with an application having a graphical user interface, or a screen in a text-based application. In one embodiment, form 230 is part of a "dashboard" interface provided by the PDM 202. The example personal data update form 230 includes a contact information section 231*a*, a personal identity information section 231*b*, a financial information section 231*c*, a contact preferences section 231*d*, a travel preferences section 231*e*, an other information section 231*f*, a local update control 234, and a global update control 235. Each of the information sections 231*a*-231*f* may be expanded or collapsed by selection of a corresponding expand section control 232 or collapse section control 233. In the illustrated example, only the contact information section 231*a* and contact preferences section 231*d* are in an expanded state, while the other information sections are in a collapsed state. Here, the user has changed his telephone number and altered his contact preferences to include e-mail and telephone, but not postal mail.

Once the user has updated one or more personal data items, the user may select the local update control 234 or the global update control 235. If the user selects the local update control 234, the updated personal data items are then currently stored in the user's secure personal data store. The user may later elect to push the update to all subscribers to the updated personal data items, or the updated personal data items may be lazily propagated to various subscribers, as described with reference to FIG. 2C, above. Alternatively, if the user selects the global update control 235, the updated personal data items are stored in the user's secure personal data store, and then actively propagated, or pushed, to all subscribers to the updated personal data items, as also described with reference to FIG. 2C, above.

As noted, a user may in some cases utilize multiple secure personal data stores. Techniques similar to those described with reference to FIGS. 2C and 2D, above, may be utilized to synchronize personal data items between multiple secure personal data stores. For example, the user may be provided with a control on the personal data update form 230 that allows the user to select one or more personal data stores to which the updated personal data items are to be propagated.

FIG. 2E depicts an account update form that may be used by a user to consent to the transmission of updated personal data items to a personal data subscriber. The account update user interface (e.g., form) 240 may be displayed by a client application, such as a Web browser, when a user visits a Web site associated with a personal data subscriber after the user has updated one or more personal data items, such as by operating the form 230 described with reference to FIG. 2D. In one embodiment, form 240 is part of a "dashboard" interface provided by the PDM 202. In this particular example, the account update form 240 is provided by a Web site operated by a bank at which the user holds an account, as described with reference to FIGS. 2A-2B, above. In other embodiments, the account update form 240 is provided by the personal data manager itself, but may be customized to reflect the business identity of the particular personal data subscriber. The example account update form 240 includes a phone number section 241, a contact preferences section 242, a terms and conditions section 243, an account update control 244, and a subscriber brand information section 245. The phone number section 241 and the contact preferences section 242 indicate that the user's telephone number and contact preferences, respectively, have changed since the user's most recent interaction with the bank. In addition, the terms and conditions section 243 indicates that the bank has modified its terms and conditions since the user's most recent interaction. The subscriber brand information section 245 may include a logo or other branding information related to the personal data subscriber. In this manner, the experience provided by the account update form 240 may be customized to reflect the identity of the personal data subscriber to the user. Upon reviewing the information in sections 241-243, the user may select the account update control 244 to consent to the transmission of the updated personal data items to the bank.

Note that although the example of FIG. 2E has been described with reference to a lazy update of personal data items, a similar form or user interface control may be utilized in the context of active propagation of updated personal data items. For example, returning to FIG. 2D, when the user selects the global update control 235, the personal data manager may display a user interface control similar to the account update form 240 to notify the user that the updated personal data items are about to be transmitted to the bank, and to provide the user with the option of disabling the transmission. In other embodiments, the personal data manager may provide a user interface control that lists all subscribers to the updated personal data items, and provides the user the option to select (or deselect) which, if any, subscribers should be notified of the updated personal data items. In such a manner, the user may be provided with fine-grained control over which subscribers should receive updated personal data items during the course of active personal data propagation.

In addition, techniques similar to those described with reference to FIGS. 2C-2D, above, may be utilized to propagate personal data items from a personal data subscriber to a secure personal data store. For example, when a personal data manager propagates updated personal data items to a personal data subscriber, that personal data subscriber may also propagate one or more data items to the personal data manager for storage as personal data items on the secure personal data store associated with the personal data manager. For example, a bank may have changed its customer service telephone number, and accordingly may provide this telephone number to a personal data manager for storage on one or more secure personal data stores associated with that personal data manager. The personal data manager may obtain updated data items from personal data subscribers in various ways. In a "lazy" or "pull" approach, such updated data items are only obtained when the personal data manager interacts with the personal data subscriber for some other reason, such as to transmit updated personal data items from the secure personal data store to the personal data subscriber, or when the user interacts with the personal data subscriber to perform some transaction. In an "active" or "push" approach, the personal data manager determines the identities of personal data subscribers (e.g., such as by interacting with the personal data propagation service) that have updated data items, and then interacts with each of these personal data subscribers to obtain the updated data items. In another "active" or "push" approach, the personal data subscribers themselves initiate communication with various personal data managers for purposes of transmitting updated personal data items to those personal data managers for storage as personal data items on respective secure personal data stores. An example of such an approach is further described with reference to FIG. 8, below.

FIGS. 2F-2K illustrate alternative user interface screens provided in some embodiments. The illustrated user interface screens may be provided by, for example, the PDM 202 in addition to, or instead of, the user interface screens discussed above with respect to FIGS. 2A-2E.

FIG. 2F depicts an example account creation form provided by an example embodiment of a personal data manager. In particular, FIG. 2F shows an account creation form 250 similar to the account creation form 210 described with reference to FIG. 2B. The account creation form 250 includes a user-supplied personal data section 251 and a subscriber-supplied personal data section 252. The user-supplied personal data section includes controls for specifying various types of information about the user, including identity information (e.g., name, date of birth, addresses), financial information (e.g., credit card numbers, security codes, billing addresses), and contact preference information. The subscriber-supplied personal data section 252 includes information that may be supplied by the personal data subscriber and that may be stored in the secure personal data store. Such information includes a customer number, contact information (e.g., helpline telephone number), marketing information (e.g., a company logo), transaction information, and terms and conditions information.

Figure 2G:

FIG. 2G depicts a subscriber information dashboard provided by an example embodiment of a personal data manager. In particular, FIG. 2G shows a subscriber information dashboard 260 provided by a personal data manager to provide information to a user about one or more subscribers to that user's personal information. The dashboard 260 includes four subscriber information sections 261a-261d. Subscriber information sections 261a and 261b are in a "maximized state," while sections 261c and 261d are in a "minimized" state. Subscriber information section 261a provides information about a subscriber named "ABC Inc." In particular, the section 261a identifies one or more personal data items that are shared by the user with the subscriber, such as name, date of birth, email address, etc. Subscriber information section 261b provides information about a subscriber named "ACME BANK." In particular, the section 261b identifies personal data items provided by the user to the subscriber (e.g., name, address, credit card information), as well as personal data items provided by the subscriber to the user (e.g., customer number, helpline number, company logo, transaction history).

Furthermore, sections 261a-261b include controls that are operable by a user to perform various actions with respect to the illustrated personal data items. For example, as shown in sections 261a-261b, delete account controls (e.g., buttons) are provided. By selecting such a button, the user can cause the deletion of an account and associated personal data items that are stored by the corresponding subscriber. In addition, button selection may cause the deletion of the corresponding personal data items and any associated data structures stored on the secure personal data store. In other embodiments, the personal data items are not deleted from the secure personal data store so long as they are in use by other subscribers.

In addition, the dashboard 260 includes update status indicators 262 and 263. Status indicator 262 (e.g., a checkmark) indicates to the user that the personal data items in section 261a are up-to-date with respect to the subscriber ABC Inc. In other words, the personal data items shown in section 261a have not been modified by the user since the most recent interaction with the subscriber ABC Inc. Status indicator 263 (e.g., a cross) indicates to the user that the personal data items in section 261d (not shown) are out of date with respect to the subscriber ZZZ Ltd.

Furthermore, the dashboard 260 includes community information sections that each provide community information about a corresponding personal data subscriber. For example, community information section 265 provides community information about the subscriber ABC Inc. Community information includes information obtained from sources external to the personal data manager and/or personal data subscriber, such as social networks, ratings Web sites, usage Web sites, discussion boards, etc. Such information may include, for example, ratings (e.g., shown as a number of stars, a letter grade), usage information (e.g., access statistics), content feeds related to the subscriber, tags related to the subscriber, user comments related to the subscriber, etc.

Figure 2H:
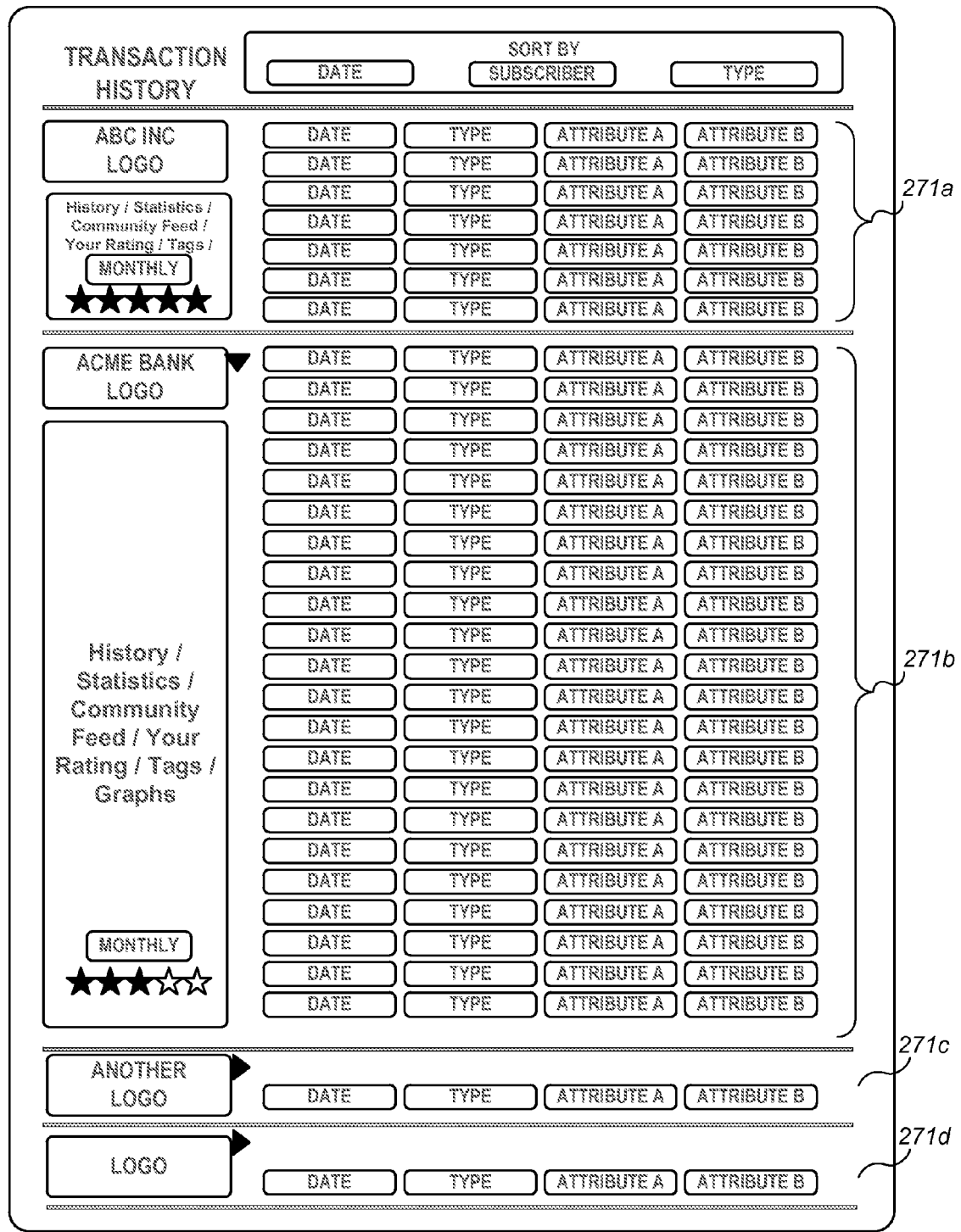

FIG. 2H depicts a transaction history dashboard provided by an example embodiment of a personal data manager. In particular, FIG. 2H shows a transaction history information dashboard 270 provided by a personal data manager to provide transaction history information on a per-subscriber basis. The dashboard 270 includes four subscriber information sections 271a-271d that each provide information about one or more transactions performed by the user with respect to the corresponding subscriber. Each section 271a-271d depicts one or more transactions by displaying a corresponding transaction date, transaction type, and various other transaction attributes (e.g., currency amount, tracking number, status).

Figure 2I:
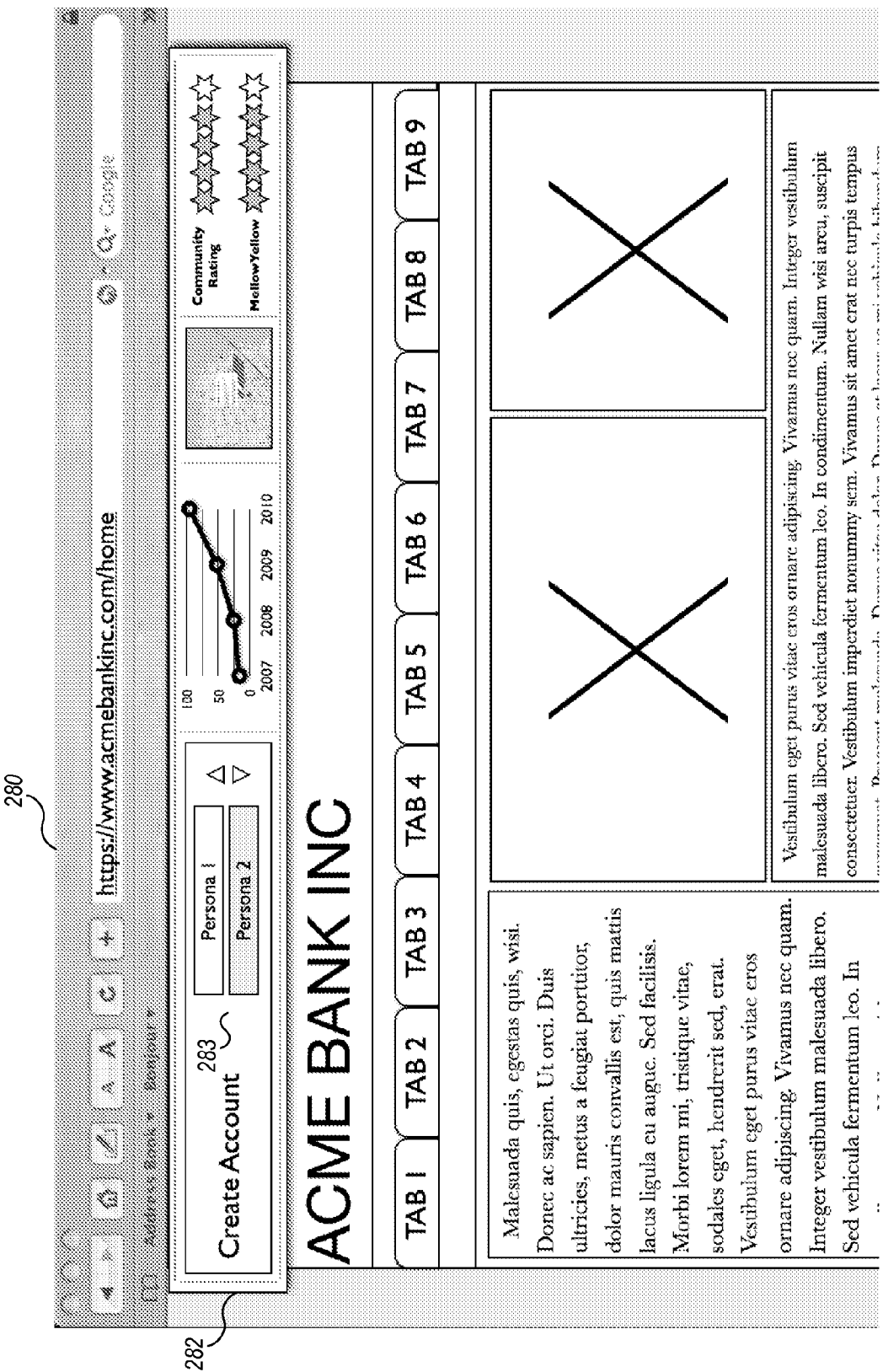
Figure 2J:
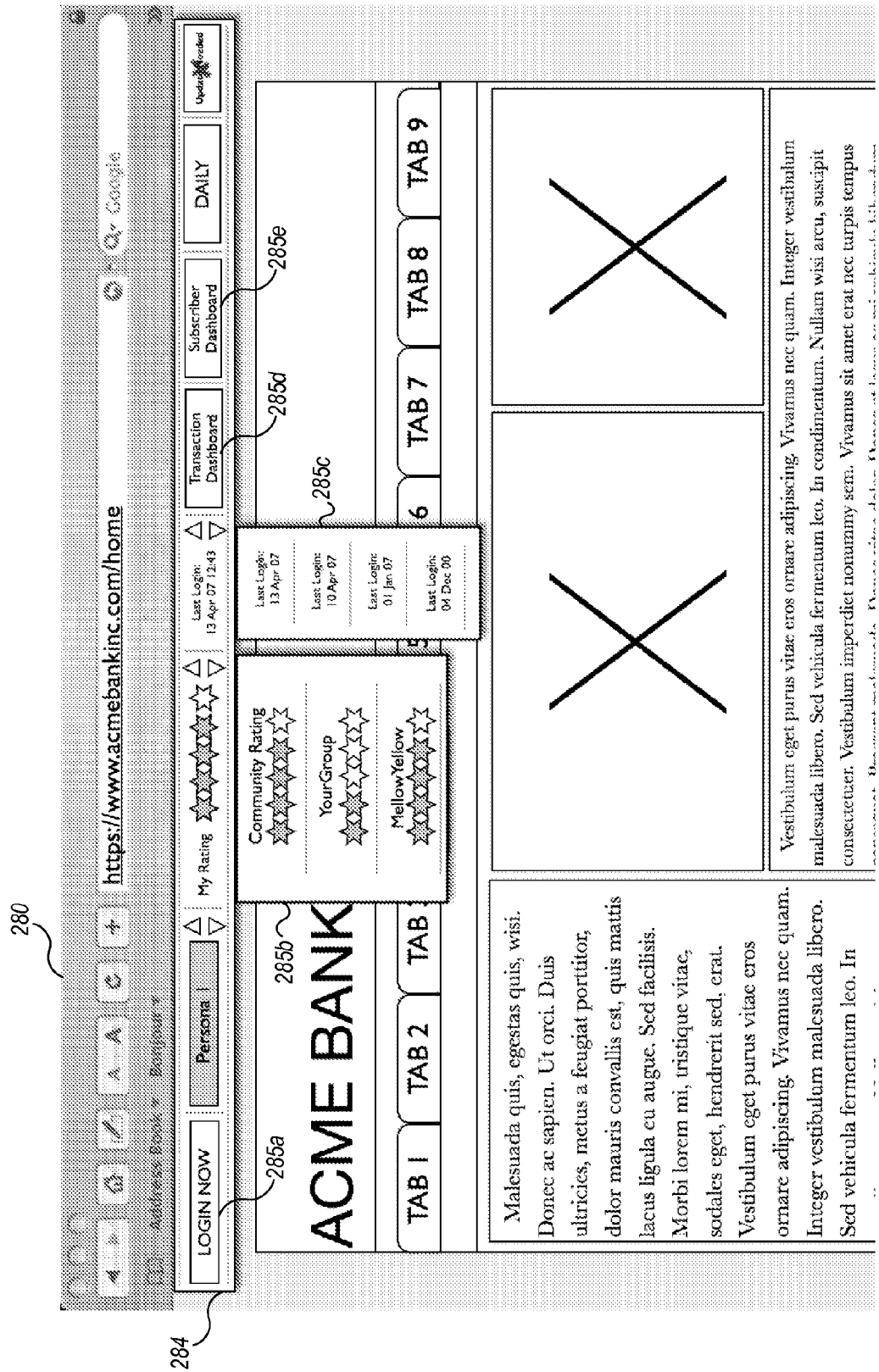
Figure 2K:
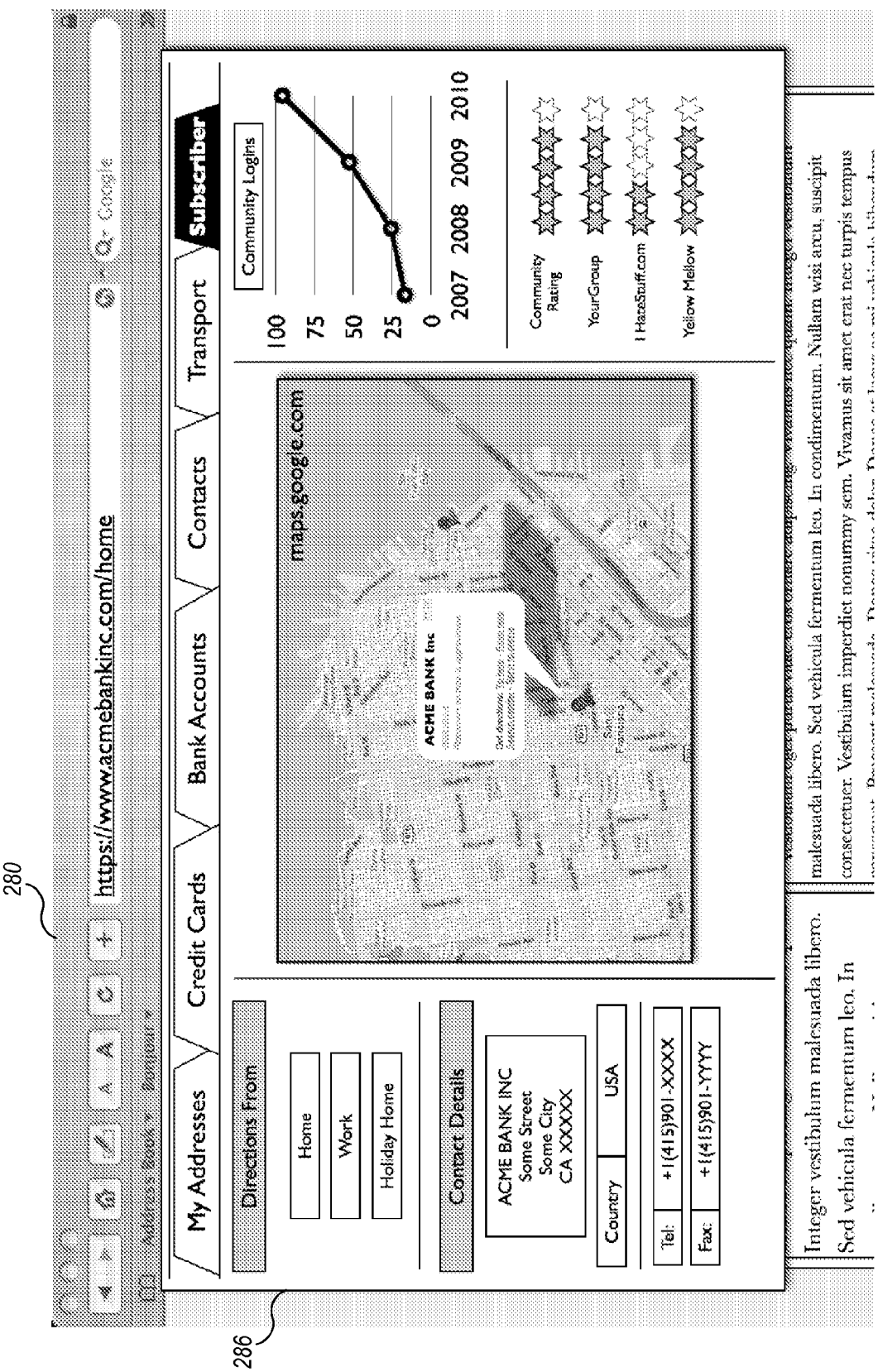

FIGS. 2I-2K, below, illustrate various aspects of a personal data manager user interface operating in conjunction with a Web browser application. In the illustrated embodiment, the personal data manager provides at least some of its user interface functionality as a "companion" tool, application, or widget to a Web browser, such that a user of the Web browser may conveniently access features of the personal data manager while browsing the Web.

FIG. 2I depicts an account creation control provided by an example embodiment of a personal data manager. In particular, FIG. 2I shows a Web browser 280 with a companion account creation control 282. In this example, a user of the Web browser 280 is accessing a Web site provided by a personal data subscriber called ACME BANK Inc. In response, a personal data manager associated with the user has automatically placed (e.g., popped up) the account creation control 282 over the ACME BANK Web page displayed by the Web browser 280. The account creation control 282 provides controls 283 for creating a new account with one of the user's one or more user personas (e.g., identities) managed by the personal data manager. By selecting one of the controls 283, the associated personal data manager automatically creates an account with ACME BANK Inc. In another embodiment, the personal data manager may display a further form, such as form 210 described with reference to FIG. 2B, that is automatically populated with personal data items and that provides the user with the opportunity to review information and/or manifest assent to terms and conditions. In addition, the account creation control 282 includes various community information corresponding to the subscriber ACME Bank, Inc., similar to the community information 265 described with reference to FIG. 2G, above.

FIG. 2J depicts an account login control provided by an example embodiment of a personal data manager. In particular, FIG. 2J shows the Web browser 280 described with reference to FIG. 2I, along with a companion account login control 284. In this example, the user of the Web browser 280 is accessing a Web site provided by a personal data subscriber called ACME BANK Inc., with which the user has an existing user account, established as described with respect to FIG. 2I, above. In response to the user accessing the Web site, the personal data manager associated with the user has automatically placed (e.g., popped up) the account login control 284 over the ACME BANK Web page displayed by the Web browser 280. The account login control 284 includes a login control 285a, community information 285b related to the subscriber, a login history 285c, a control 285d to access the personal data manager's transaction dashboard, and a control 285e to access the personal data manager's subscriber information dashboard. When the user selects control 285a, the personal data manager automatically logs the user into the Web site, such as by transmitting to the Web site the relevant personal data items (e.g., user name and/or password) stored on the secure personal data store. When the user selects control 285d, the personal data manager displays transaction history information, such as by displaying the transaction history information dashboard 270 described with reference to FIG. 2H. When the user selects control 285e, the personal data manager displays subscriber information, such as by displaying the subscriber information screen described with reference to FIG. 2K, below, or by displaying the subscriber information dashboard 260 described with reference to FIG. 2G, above.

FIG. 2K depicts a subscriber information screen provided by an example embodiment of a personal data manager. In particular, FIG. 2K shows the Web browser 280 described with reference to FIG. 2I, along with a companion subscriber information screen 286. In this example, the user of the Web browser 280 is accessing a Web site provided by a personal data subscriber called ACME BANK Inc., and has requested information about this subscriber, such as by selecting control 285e in the account login control 280 described with respect to FIG. 2J. In response, the personal data manager has automatically placed (e.g., popped up) the subscriber information screen 286 over the ACME BANK Web page displayed by the Web browser 280. The subscriber information screen 286 includes contact information for the subscriber, a map showing the physical location of the subscriber, and community information (e.g., ratings, login totals) for the subscriber. In addition, the subscriber information screen 286 includes controls (e.g., tabs) that can be selected by the user to access other features of the personal data manager, such as various categories of personal information, including address information, credit card information, bank account information, contact lists, etc. In at least some embodiments, the tabs show categories of personal information tailored to, or filtered by, the particular personal data subscriber (e.g., ACME BANK), such as just personal information related to or subscribed to by ACME BANK. In other embodiments, the tabs may provide a "global" view of personal information, such as all personal information for each associated category.

Although certain terms are used primarily herein, other terms could be used interchangeably to yield equivalent embodiments and examples. For example, it is well-known that equivalent terms in the personal information management field and in other similar fields could be substituted for such terms as "personal data," "personal data subscription," "personal data manager/subscriber," etc. Specifically, the term "personal data" can be used interchangeably with "private data," "protected data," or "account data." In addition, terms may have alternate spellings which may or may not be explicitly mentioned, and all such variations of terms are intended to be included.

Example embodiments described herein provide applications, tools, data structures and other support to implement a Personal Data Propagation Environment to be used to facilitate the propagation of personal data between user devices and network-accessible services used by device users. Other embodiments of the described techniques may be used for other purposes, including for the distribution and update of software and/or software upgrades. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 3:
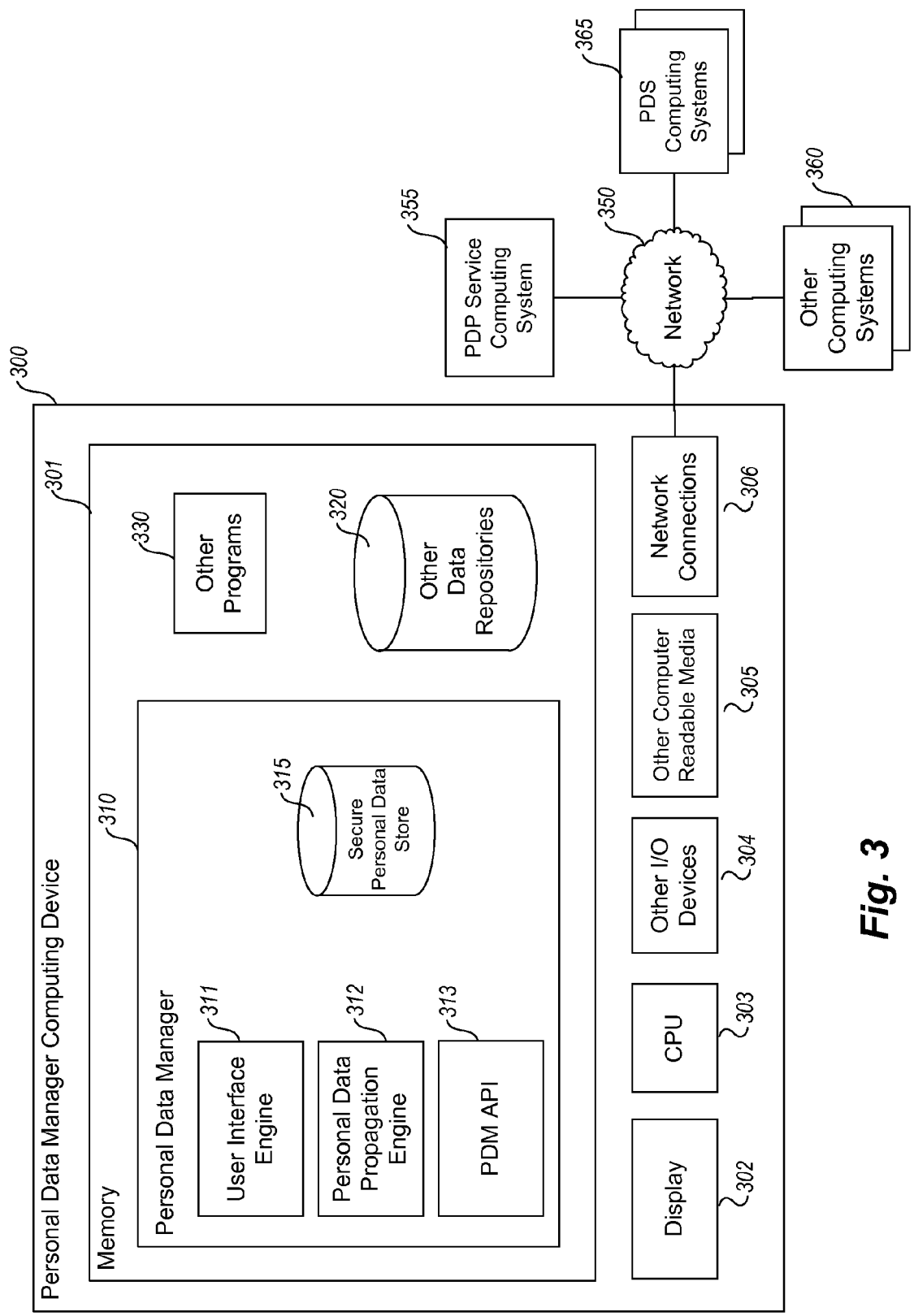
FIG. 3 is an example block diagram of a computing device for practicing embodiments of a Personal Data Manager.

FIG. 3 is an example block diagram of a computing device for practicing embodiments of a Personal Data Manager. Note that a specifically programmed general purpose computing device or a special purpose computing device may be used to implement a Personal Data Manager ("PDM") module/component. Further, the PDM may be implemented in software, hardware, firmware, or in some combination to achieve the capabilities described herein.

The computing device 300 will typically be a personal computing device, such as a personal computer, a laptop computer, a cellular telephone, a smart phone, a personal digital assistant, etc. However, in other embodiments, the computing device 300 may comprise one or more distinct computing systems/devices and may span distributed locations. In addition, each block shown may represent one or more such blocks as appropriate to a specific embodiment or may be combined with other blocks. Moreover, the various blocks of the PDM 310 may physically reside on one or more machines, which use standard (e.g., TCP/IP) or proprietary interprocess communication mechanisms to communicate with each other.

In the embodiment shown, computer device 300 comprises a computer memory ("memory") 301, a display 302, one or more Central Processing Units ("CPU") 303, Input/Output devices 304 (e.g., keyboard, mouse, CRT or LCD display), other computer-readable media 305, and network connections 306. The PDM 310 is shown residing in memory 301. In other embodiments, some portion of the contents and some or all of the components of the PDM 310 may be stored on and/or transmitted over the other computer-readable media 305. The components of the PDM 310 preferably execute on one or more CPUs 303 and manage the storage and propagation of personal data items, as described herein. Other code or programs 330 (e.g., a Web browser) and potentially other data repositories, such as data repository 320, also reside in the memory 301, and preferably execute on one or more CPUs 303. Of note, one or more of the components in FIG. 3 may not be present in any specific implementation. For example, some embodiments embedded in other software may not provide means for user input or display.

In a typical embodiment, the PDM 310 includes a user interface engine 311, a personal data propagation engine 312, a personal data manager application program interface ("PDM API") 314, and one or more secure personal data stores 315. Other and/or different modules may be implemented. In addition, the PDM 310 may interact via a network 350 with a personal data propagation service computing system 355, personal data subscriber computing systems 365, and other computing systems 360. Also, the one or more secure personal data stores 315 may be provided external to the PDM 310 as well, for example via one of the other computer readable media 305. For example, the one or more secure personal data stores 315 may be located within a memory device (e.g., a flash memory stick, smart card) that is removably coupled to the personal data manager computing device 300. In other embodiments, the one or more secure personal data stores 315 may be provided via one of the other computing systems 360, or even the PDP service computing system 355, accessible over the network 350.

The user interface engine 311 provides a view and a controller that facilitate user interaction with the PDM 310. The user interface engine 311 may, for example, provide an interactive graphical user interface (e.g., a "dashboard") that may be used by a user to manage personal data items stored on the one or more secure personal data stores 315, view transaction history, manage subscriptions, and to perform other activities. Such a graphical user interface may provide access to functions for creating, updating, deleting, and otherwise manipulating personal data items. In addition, the user interface engine 311 may provide functions for controlling the propagation of personal data from the one or more secure personal data stores 315 to the PDS computing systems 365, such as by initiating active or lazy propagation of updated personal data items.

The personal data propagation engine 312 manages the propagation of personal data. Propagating personal data may include managing (e.g., creating, storing, updating, deleting, forwarding, receiving) personal data items on the one or more secure personal data stores 315. In addition, propagating personal data may include communicating with personal data subscribers, such as one or more of the PDS computing systems 365, in order to receive and/or forward (e.g., transmit) personal data items. Furthermore, propagating personal data may include communicating with a personal data propagation service, such as the PDP service computing system 355, in order to authenticate personal data subscribers, determine subscriptions associated with personal data subscribers, receive software updates (e.g., to the PDM 310 software), initiate or otherwise facilitate payments (e.g., from the user to a personal data propagation service and/or personal data subscriber to utilize the personal data propagation service, or from a personal data subscriber to the user to provide access to personal information), etc.

The PDM API 313 provides programmatic access to one or more functions of the PDM 310. For example, the PDM API 313 may provide an interface that provides access to one or more functions that may be invoked by one of the other programs 330 in order to manipulate and/or propagate personal data items stored in the one or more secure personal data stores 315 in an automated or semi-automated manner. In this manner, the PDM API 313 may facilitate the development of third-party software, such as user interfaces, plug-ins, adapters (e.g., for integrating the PDM 310 into desktop applications), etc. In addition, the PDM API 313 may be in at least some embodiments invoked or otherwise accessed via remote entities, such as the PDP service computing system 355, the other computing systems 360, and/or the PDS computing systems 365, to access various functionality of the PDM 310, such as the retrieval and/or storage of personal data items.

The one or more secure personal data stores 315 record personal data items as well as information related to the personal data propagation processes managed by the PDM 310. Such information may include subscriber and/or subscription information (e.g., subscriptions associated with particular subscribers), operational history information (e.g., a time stamped transaction log of personal data update events, personal data propagation events), service information (e.g., electronic addresses for a preferred or commonly utilized personal data propagation service computing system), etc.

Figure 4:
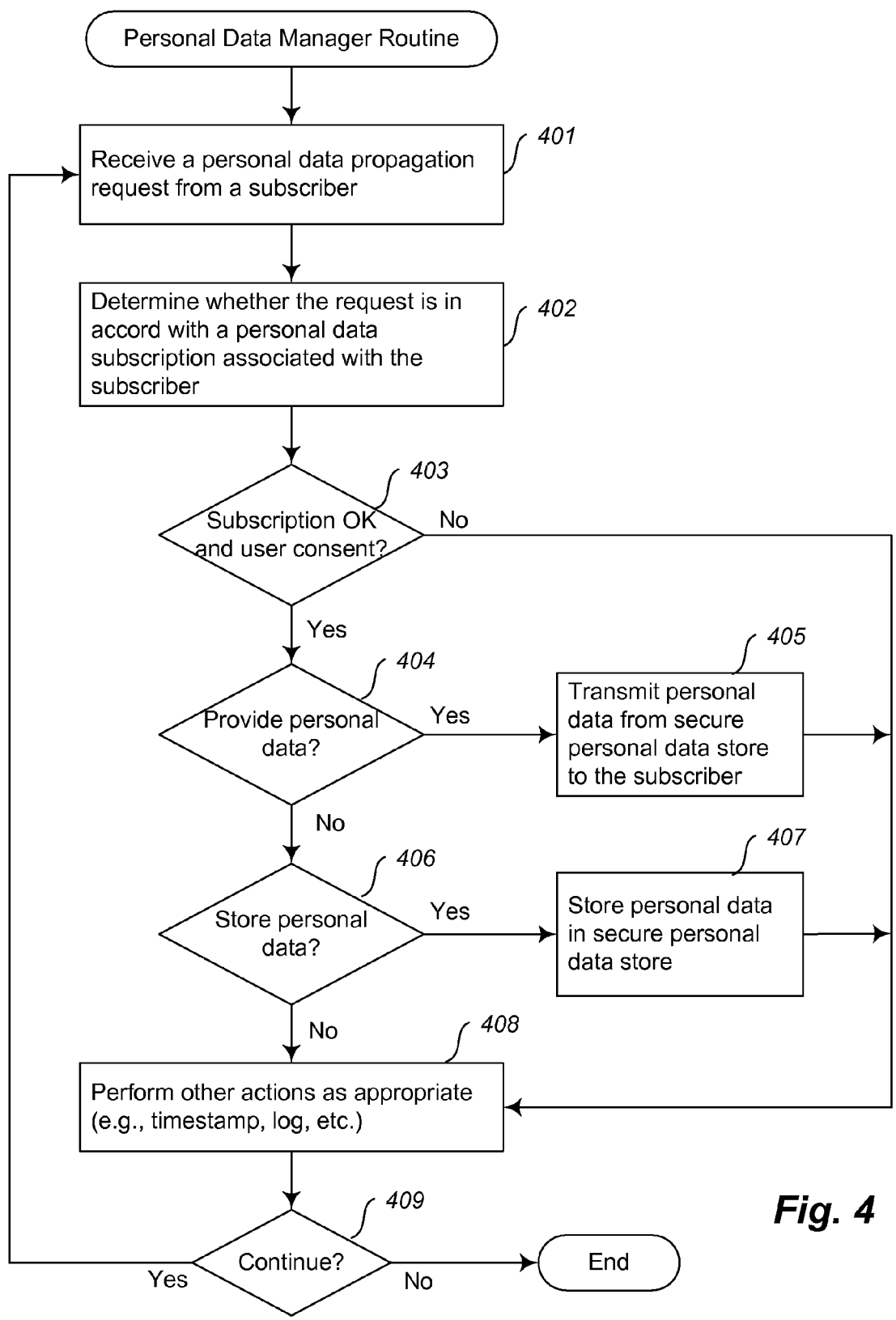
FIG. 4 is an example flow diagram of a first example personal data manager routine provided by an example embodiment of a Personal Data Manager.

FIG. 4 is an example flow diagram of a first example personal data manager routine provided by an example embodiment of a Personal Data Manager. The illustrated routine may be performed by the PDM 105, described with reference to FIG. 1 to facilitate the propagation of personal data. The illustrated process demonstrates the propagation of personal data between a personal data manager and a personal data subscriber.

More specifically, in steps 401-409, the routine performs a loop in which it repeatedly receives and processes data propagation requests from a personal data subscriber. In particular, in step 401, the routine receives a personal data propagation request from a personal data subscriber. The personal data propagation request may include an indication of the type of action to be taken (e.g., to provide and/or read one or more personal data items, to receive and/or store one or more personal data items) along with a unique identifier associated with the personal data subscriber. The personal data propagation request may be received in various ways. In one embodiment, the personal data propagation request may be received directly via a network, such as by listening on a TCP port or other network communication abstraction (e.g., a message queue). In another embodiment, the personal data propagation request may be received indirectly via some intermediary code module, such as a client application (e.g., a Web browser, a plug-in, third-party application) that is configured to forward and/or dispatch requests received from a personal data subscriber to the personal data manager.

In step 402, the routine determines whether the received request is in accord with a personal data subscription associated with the subscriber. In some embodiments, this determination may be made in an "online" manner, by communicating with a personal data propagation service to authenticate the personal data subscriber (e.g., by transmitting the unique identifier received in step 401, above) and to ascertain whether the personal data subscriber is currently associated with a valid subscription that entitles access to the personal data that is the subject of the request. In other embodiments, this determination may be made in an "offline" manner, by utilizing cached or otherwise previously stored information about personal data subscribers and their associated subscriptions. In one embodiment, a subscription includes one or more indications of personal data items to which a personal data subscriber associated with the subscription is entitled access. In such an embodiment, determining whether the received request is in accord with the personal data subscription may include determining whether each of the personal data items in the request are also indicated in the personal data subscription.

In step 403, the routine determines whether the request was determined in step 402 to be in accord with a personal data subscription associated with the subscriber and whether user consent has been obtained, and if so, proceeds to step 404, else proceeds to step 408. The routine may obtain user consent in various ways. For example, the routine may interactively prompt the user, by notifying him of the personal data propagation request and asking that he manifest consent to transmission of the personal data that is the subject of the request. In other embodiments, the routine may rely upon previously granted consent obtained from the user, such as when a user has previously indicated that all personal data propagation requests from a particular subscriber and/or for particular types of personal data are to be allowed without additional interactive prompting.

In step 404, the routine determines whether the received request was to provide personal data to the subscriber, and if so, proceeds to step 405, else proceeds to step 406. In step 405, the routine transmits the requested personal data from a secure personal data store managed by the personal data manager to the subscriber. Transmitting the requested personal data from the secure personal data store may include reading an encrypted version of the requested personal data from the secure personal data store, decrypting the personal data, and then forwarding (e.g., over a network connection or pipe, via an output parameter or return value, via a message) the decrypted personal data to the personal data subscriber. In a typical embodiment, the communication link between the personal data manager and the personal data subscriber is itself encrypted, so as to prevent eavesdropping and/or interception of personal data items. The routine then proceeds to step 408.

In step 406, the routine determines whether the received request was to store personal data in the secure personal data store, and if so, proceeds to step 407, else proceeds to step 408. In step 407, the routine stores personal data in the secure personal data store. Storing the personal data in the secure data store may include encrypting the personal data and writing or otherwise storing the encrypted personal data in the secure personal data store. The routine then proceeds to step 408.

Note that in some embodiments, the routine may provide and store personal data as part of a single interaction with the personal data subscriber. In particular, the request received in step 401 may identify personal data items requested by the personal data subscriber as well as personal data items provided by the personal data subscriber for storage in the secure personal data store. In such cases, the routine may be modified such that both steps 405 and 407 are performed within a single iteration of loop 401-409. The personal data subscriber may provide various types of personal data for storage by the personal data manager, such as transaction information (e.g., a transaction identifier, a tracking code), updated balance information (e.g., a new account balance), updated contact information (e.g., an updated customer service telephone number), etc.

In step 408, the routine performs other actions as appropriate. In this step, the routine may perform various actions, such as logging details of the personal data request (e.g., the type of request processed, the time of the request), generating entries in an error log or otherwise handling errors (e.g., when the personal data request was not processed for want of an adequate subscription, authentication failure, lack of user consent), etc. In some embodiments, the routine may also determine whether there are any other personal data items in the secure personal data store that have been recently updated but not yet transmitted to the personal data subscriber, so as to further synchronize the personal data items stored on the secure personal data store with those utilized by the personal data subscriber.

In step 409, the routine determines whether to continue, and if so, continues the loop of steps 401-409, else ends.

Note that although this routine has been described as interacting with a personal data subscriber, a similar routine may be utilized to interact with a user associated with the secure personal data store. For example, in some embodiments a similar routine may be utilized as a basis for the personal data update form (or similar user interface) described with reference to FIG. 2D, above. In such cases, the user himself may be regarded as a special case of a personal data subscriber, who has a personal data subscription that entitles the user to total access to, and control over, the secure personal data store.

Figure 5:
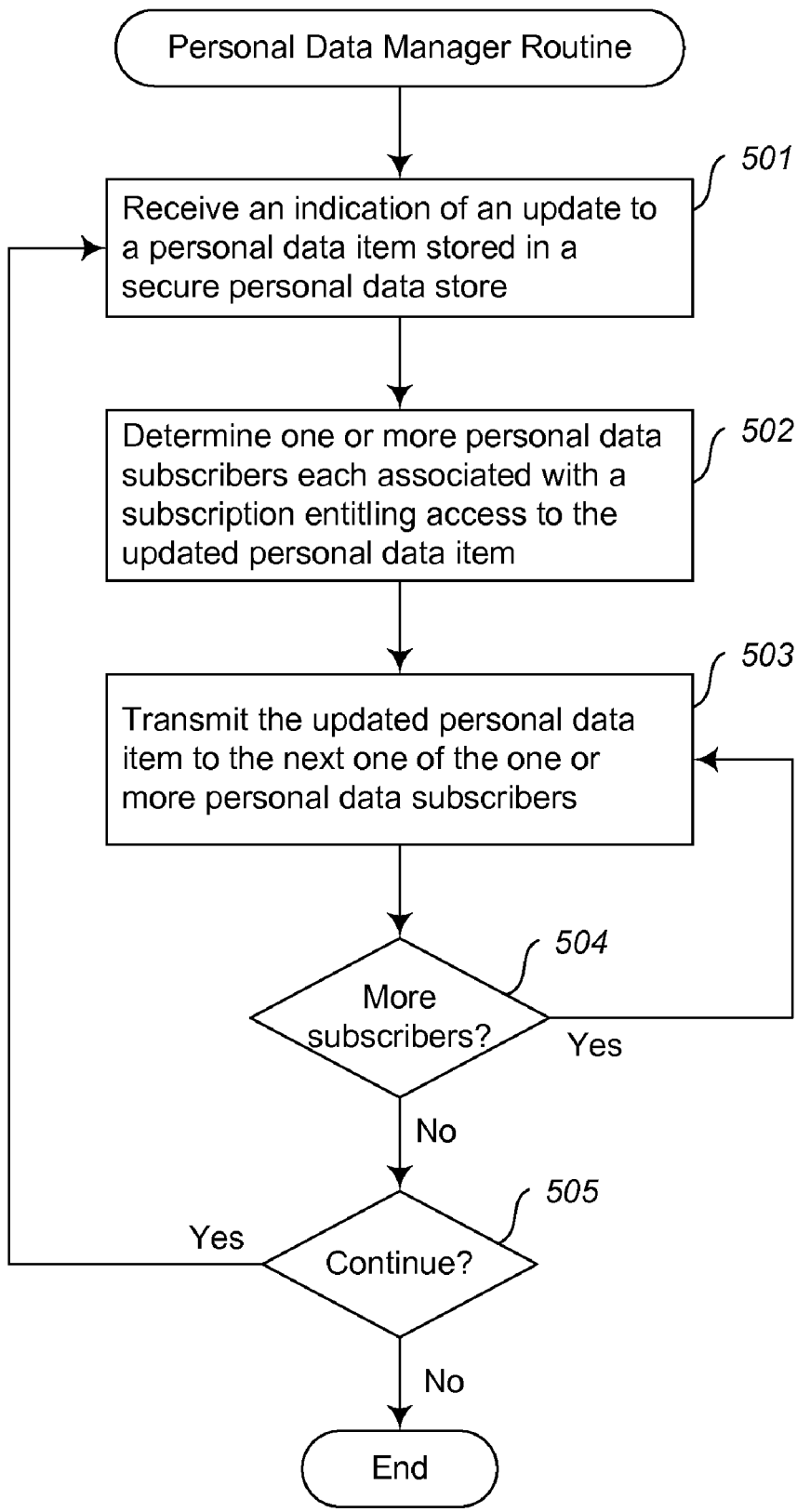
FIG. 5 is an example flow diagram of a second example personal data manager routine provided by an example embodiment of a Personal Data Manager.

FIG. 5 is an example flow diagram of a second example personal data manager routine provided by an example embodiment of a Personal Data Manager. The illustrated routine may be performed by the PDM 105, described with reference to FIG. 1 to facilitate the propagation of personal data. The illustrated process demonstrates the propagation of personal data between a personal data manager and a personal data subscriber, by pushing updated personal data from a secure personal data store to one or more personal data subscribers, as described with reference to FIGS. 2C-2K, above.

More specifically, in steps 501-505, the routine performs a loop in which it repeatedly receives an indication of an update to a personal data item and transmits the updated personal data item to one or more personal data subscribers that each have subscriptions entitling access to the personal data item. In particular, in step 501, the routine receives an indication of an update to a personal data item stored in a secure personal data store that is managed by the personal data manager. Such an indication may be received in various ways, such as by event notification (e.g., that the secure personal data store has been modified), procedure call (e.g., that is invoked by a user application that has modified the secure personal data store), etc. The indication will typically include an indication of which personal data item has been updated.

In step 502, the routine determines one or more personal data subscribers that are each associated with a subscription entitling the associated personal data subscriber to access to the updated personal data item. This determination may be made in an online manner, such as by requesting that the personal data propagation service provide a list of one or more personal data subscribers having entitling subscriptions with respect to the updated personal data item. In other embodiments, this determination may be made in an offline manner, by utilizing cached or otherwise previously stored information about personal data subscribers and their associated subscriptions.

In step 503, the routine transmits the updated personal data item to the next one of the one or more personal data subscribers determined in step 502. Transmitting the updated personal data to the next personal data subscriber may include reading an encrypted version of the updated personal data item from the secure personal data store, decrypting the personal data item, and then forwarding the decrypted personal data item to the personal data subscriber. In a typical embodiment, the communication link between the personal data manager and the personal data subscriber is itself encrypted, so as to prevent eavesdropping and/or interception of personal data items.

In some embodiments, the transmission of updated personal data items is conditioned upon user consent. For example, the user may be asked, on a subscriber-by-subscriber and/or a personal data item-by-item basis to consent to the transmission of updated personal data items.

In step 504, the routine determines if there are more subscribers to which to transmit the updated personal data item, and if so, proceeds to step 503 and continues the loop of step 503-504, else proceeds to step 505. In step 505, the routine determines whether to continue, and if so, continues the loop of steps 501-505, else ends.

Note that although this routine has been described as propagating a single updated personal data item at a time, other embodiments may propagate multiple updated personal data items, if any, at a time. For example, for each personal data subscriber with an entitling subscription, the personal data manager could transmit all updated personal data items (e.g., in a single message) to which the subscriber has an entitling subscription.

Figure 6:
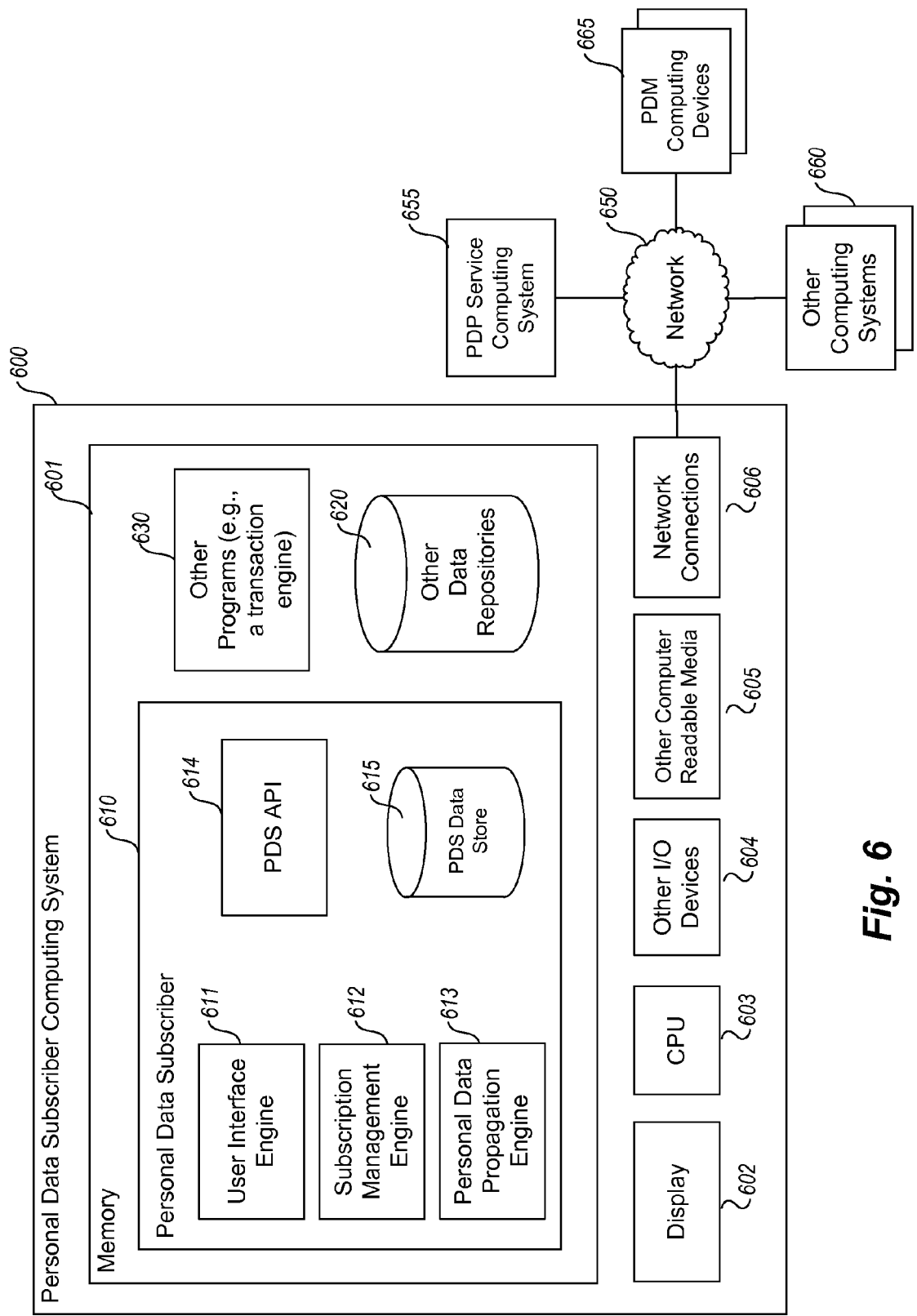
FIG. 6 is an example block diagram of a computing system for practicing embodiments of a Personal Data Subscriber.

FIG. 6 is an example block diagram of a computing system for practicing embodiments of a Personal Data Subscriber. Note that a specifically programmed general purpose computing system or a special purpose computing system may be used to implement a Personal Data Subscriber ("PDS") module/component. Further, the PDS may be implemented in software, hardware, firmware, or in some combination to achieve the capabilities described herein.

The computing system 600 may comprise one or more server and/or client computing systems and may span distributed locations. In addition, each block shown may represent one or more such blocks as appropriate to a specific embodiment or may be combined with other blocks. Moreover, the various blocks of the PDS 610 may physically reside on one or more machines, which use standard (e.g., TCP/IP) or proprietary interprocess communication mechanisms to communicate with each other.

In the embodiment shown, computer system 600 comprises a computer memory ("memory") 601, a display 602, one or more Central Processing Units ("CPU") 603, Input/Output devices 604 (e.g., keyboard, mouse, CRT or LCD display), other computer-readable media 605, and network connections 606. The PDS 610 is shown residing in memory 601. In other embodiments, some portion of the contents and some or all of the components of the PDS 610 may be stored on and/or transmitted over the other computer-readable media 605. The components of the PDS 610 preferably execute on one or more CPUs 603 and manage the storage and propagation of personal data items, as described herein. Other code or programs 630 (e.g., a transaction engine and/or a Web server) and potentially other data repositories, such as data repository 620, also reside in the memory 601, and preferably execute on one or more CPUs 603. Of note, one or more of the components in FIG. 6 may not be present in any specific implementation. For example, some embodiments embedded in other software may not provide means for user input or display.

In a typical embodiment, the PDS 610 includes a user interface engine 611, a subscription management engine 612, a personal data propagation engine 613, a personal data subscriber application program interface ("PDS API") 614, and one or more personal data subscriber data stores 615. Other and/or different modules may be implemented. In addition, the PDS 610 may interact via a network 650 with a personal data propagation service computing system 655, personal data manager computing devices 665, and other computing systems 660. Also, the one or more personal data subscriber data stores 615 may be provided external to the PDS 610 as well, for example via one of the other computer readable media 605. In the illustrated embodiment, one of the other programs 630 may be or include a transaction engine that utilizes personal data items obtained from the one or more PDM computing devices 665. In other embodiments, such a transaction engine may be located on another computing system, such as the one or more other computing systems 660.

The user interface engine 611 provides a view and a controller that facilitate user interaction with the PDS 610. The user interface engine 611 may, for example, provide an interactive graphical user interface (e.g., a "dashboard") that may be used by an administrative user to manage personal data subscriptions obtained via the PDP service computing system 655. Such a graphical user interface may provide functions for obtaining, creating, mapping, updating, deleting, forwarding, and otherwise manipulating personal data subscriptions and/or the actual personal data items associated with particular subscriptions (e.g., a user's account information). In addition, the user interface engine 611 may provide functions for controlling the propagation of personal data between the one or more PDM computing devices 665 and the one or more PDS data stores 615.

The subscription management engine 612 provides functions for obtaining, creating, updating, deleting, forwarding, and otherwise manipulating personal data subscriptions. In a typical embodiment, the subscription management engine 612 performs at least some of its functions by interacting with the PDP service computing system 655. For example, the subscription management engine 612 may obtain a new subscription, or modify an existing subscription, for the PDS 610 by communicating with the PDP service computing system 655. In some embodiments, the PDP service computing system 655 provides at least some of its services in exchange for a fee or other compensation. In such cases, the subscription management engine 612 may also engage in the initiation of payments in exchange for such services (e.g., payments to a personal data propagation service to utilize the service, payments to users in exchange for information obtained from those users).

The personal data propagation engine 613 manages the propagation of personal data between the PDS 610 and the one or more PDM computing devices 665. Propagating personal data may include obtaining (e.g., receiving) personal data items from the one or more PDM computing devices 665. The obtained personal data items may be stored in the one or more PDS data stores 615 for use by the other programs 630, such as a transaction management engine. Propagating personal data may also include forwarding (e.g., transmitting, sending) personal data items from the one or more PDS data stores 615 to the one or more PDM computing devices 665. Furthermore, propagating personal data may include communicating with the PDP service computing system 655, in order to authenticate the one or more PDM computing devices 665, receive software updates (e.g., to the PDS 610 software), etc.

The PDS API 614 provides programmatic access to one or more functions of the PDS 610. For example, the PDS API 614 may provide an interface that provides access to one or more functions that may be invoked by a transaction engine executing as one of the other programs 630 in order to cause the propagation of personal data between the PDS 610 and the one or more PDM computing devices 665 in an automated or semi-automated manner. In this manner, the PDS API 614 may facilitate the development of third-party software, such as user interfaces, adapters (e.g., for integrating the PDS 610 into electronic commerce applications), etc. In addition, the PDS API 614 may be in at least some embodiments invoked or otherwise accessed via remote entities, such as the PDP service computing system 655 and/or the PDM computing devices 665, to access various functionality of the PDS 610. For example, the one or more PDM computing devices 665 may utilize (e.g., call, invoke, execute) functions of the PDS API 614 to automatically push updated personal data items to the PDS 610 for storage in the one or more PDS data stores 615.

The one or more PDS data stores 615 record personal data items as well as information related to the personal data propagation processes managed by the PDS 610. Such information may include subscriber and/or subscription information, operational history information (e.g., a time stamped transaction log of interactions with personal data managers and/or the PDP service, software versioning information), service information (e.g., electronic addresses for a preferred or commonly utilized personal data propagation service computing system), etc.

In addition, the PDS 610 may perform various functions related to access to, or integration with, other programs, computing systems, and/or data stores. For example, a bank may store user information (e.g., account information) in a "legacy" database, such as may be provided by one of the other data repositories 620. In such an environment, the PDS 610 may provide functions for mapping, translating, or wrapping information stored in the legacy database such that it may be manipulated by the PDS 610. Similarly, the PDS 610 may provide functions for mapping information managed by the PDS 610 (e.g., personal data subscriptions) to corresponding information in the legacy database (e.g., users associated with personal data subscriptions).

Figure 7:
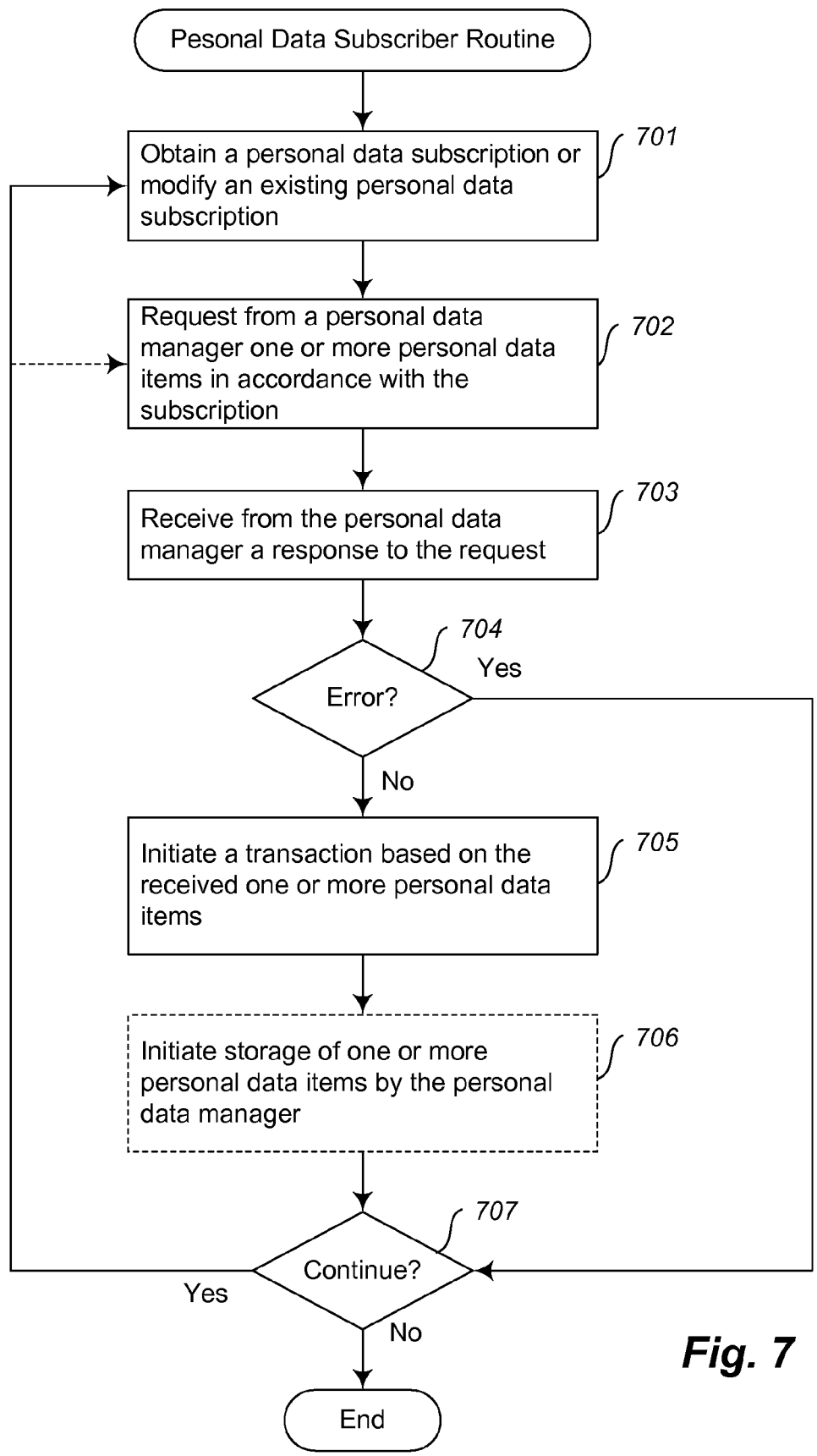
FIG. 7 is an example flow diagram of a first example personal data subscriber routine provided by an example embodiment of a Personal Data Subscriber.

FIG. 7 is an example flow diagram of a first example personal data subscriber routine provided by an example embodiment of a Personal Data Subscriber. The illustrated routine may be performed by the PDS 106, described with reference to FIG. 1 to facilitate the propagation of personal data. The illustrated process demonstrates the propagation of personal data between a personal data manager and a personal data subscriber, by requesting personal data items from a personal data manager and initiating a transaction based on the requested personal data items.

More specifically, in steps 701-707, the routine performs a loop in which it repeatedly receives a requested one or more personal data items from a personal data manager, initiates a transaction based on the received personal data items, and optionally initiates storage of one or more personal data items on a secure personal data store associated with the personal data manager. In particular, in step 701, the routine obtains a personal data subscription or modifies an existing personal data subscription. As discussed above, a personal data subscription entitles the personal data subscriber to access one or more personal data items managed by a plurality of personal data managers. In addition, obtaining/modifying a personal data subscription may include interacting with a personal data propagation service, so as to cause the service to associate the personal data subscriber with the obtained subscription.

In step 702, the routine requests from a personal data manager one or more personal data items in accordance with the subscription. Such a request may be made by, for example, opening or using a communication link (e.g., a network connection) to the personal data manager, and forwarding a personal data request that includes indications of the requested personal data items. By forwarding a personal data request to the personal data manager in step 702, above, the personal data subscriber causes the personal data manager to determine whether access by the personal data subscriber to the requested personal data items is in accord with the personal data subscription. The personal data request may also include an indication of the identity of the personal data subscriber and/or details related to the particular personal data subscription that entitles the personal data subscriber to access the requested data items. In other embodiments, the identity of the personal data subscriber may be indicated to the personal data manager in other ways, such as during the establishment of the communication link (e.g., via an authentication process engaged in during link creation), or based on the communication link itself (e.g., the IP address of one of its endpoints).

In step 703, the routine receives from the personal data manager a response to the request of step 702. As discussed, in a typical embodiment, the personal data manager will only transmit personal data items which the personal data subscriber is entitled to access in accordance with a personal data subscription associated with the subscriber. If the personal data request was in accord with the personal data subscription, the received response will include the requested one or more personal data items from a secure personal data store associated with the personal data manager. If, on the other hand, the personal data request was not in accord with the personal data subscription, the routine may here instead receive an indication of an error. Errors may be received for other reasons, such as when one or more of the requested personal data items are not present in the secure personal data store.

In step 704, the routine determines whether an error was received in step 703, and if so, proceeds to step 707, else proceeds to step 705. In step 705, the routine initiates a transaction based on the received one or more personal data items. Initiating a transaction may include forwarding the received personal data items to another module, such as a transaction engine, so that the transaction engine may utilize the received personal data items for some electronic transaction. An electronic transaction may include various types of commercial and/or electronic commerce transactions, such as a purchase, sale, and/or lease of goods and/or services, including but not limited to the purchase or sale of airline or other travel tickets; the purchase or sale of tangible goods (e.g., food, electronics items, tools, books, clothing); and lease or rental arrangements such as car rentals, vacation rentals, accommodation rentals. The exchange of money in the course of a transaction may occur in various ways, including as a credit card transaction, debit card transaction, e-cash transaction, electronic funds transfer, etc. Note that electronic transactions do not need to include an exchange of money or other consideration. For example, electronic transactions may include operations performed in support of, or in the course of, the operation of some service, including opening, closing, and/or modifying a user account; providing information (e.g., a newsletter, a document); initiating the distribution and/or receipt of goods; etc. Other types of electronic transaction include submitting a job application; performing a debit/credit card transaction; performing a money transfer; providing an offer and/or coupon for a good and/or service; providing a price quote; etc. In addition, note that the received personal data items need not be immediately used or otherwise processed by a transaction engine. In some embodiments, initiating a transaction may include storing the personal data items in a data repository, such as the one or more PDS data stores 615, described with reference to FIG. 6, for future use.

In step 706, the routine optionally initiates storage of one or more personal data items by the personal data manager. Initiating storage may include forwarding one or more personal data items to the personal data manager for storage on an associated secure personal data store. Various kinds of personal data items may be forwarded to the personal data manager, including transaction identifiers (e.g., related to the transaction initiated in step 705), account information (e.g., current balances, account numbers), terms and conditions (e.g., for using an online service), contact information (e.g., customer service telephone number), location information (e.g., GPS coordinates), etc. In some cases, the routine initiates storage of any personal data items that have been updated by the personal data subscriber since a previous interaction with the personal data manager. In this manner, the routine may implement a "lazy" synchronization of personal data items from the personal data subscriber to the personal data manager. An example of "active" synchronization is described with respect to FIG. 8, below.

In step 707, the routine determines whether to continue, and if so, continues with the loop of steps 701-707, else ends. Note that in some embodiments, the routine may proceed directly to step 702, without first performing step 701. Such a transition may occur, for example, when the previously obtained personal data subscription is appropriate for use with another personal data manager.

Other or additional functions may be performed by a personal data subscriber. In some embodiments, the personal data subscriber may automatically distribute offers, advertisements, and/or coupons to a user based on various factors, including the contents of the user's secure personal data store, historical transaction information, synthetic metrics (e.g., credit score, consumer type classification, demographic category), etc. For example, the personal data subscriber may obtain a subscription entitling access to financial transactions performed by the user and recorded on the user's secure personal data store. Based on the recorded financial transactions, the personal data subscriber may transmit a coupon, advertisement, or other offer for storage in the secure personal data store and eventual display to the user.

Figure 8:
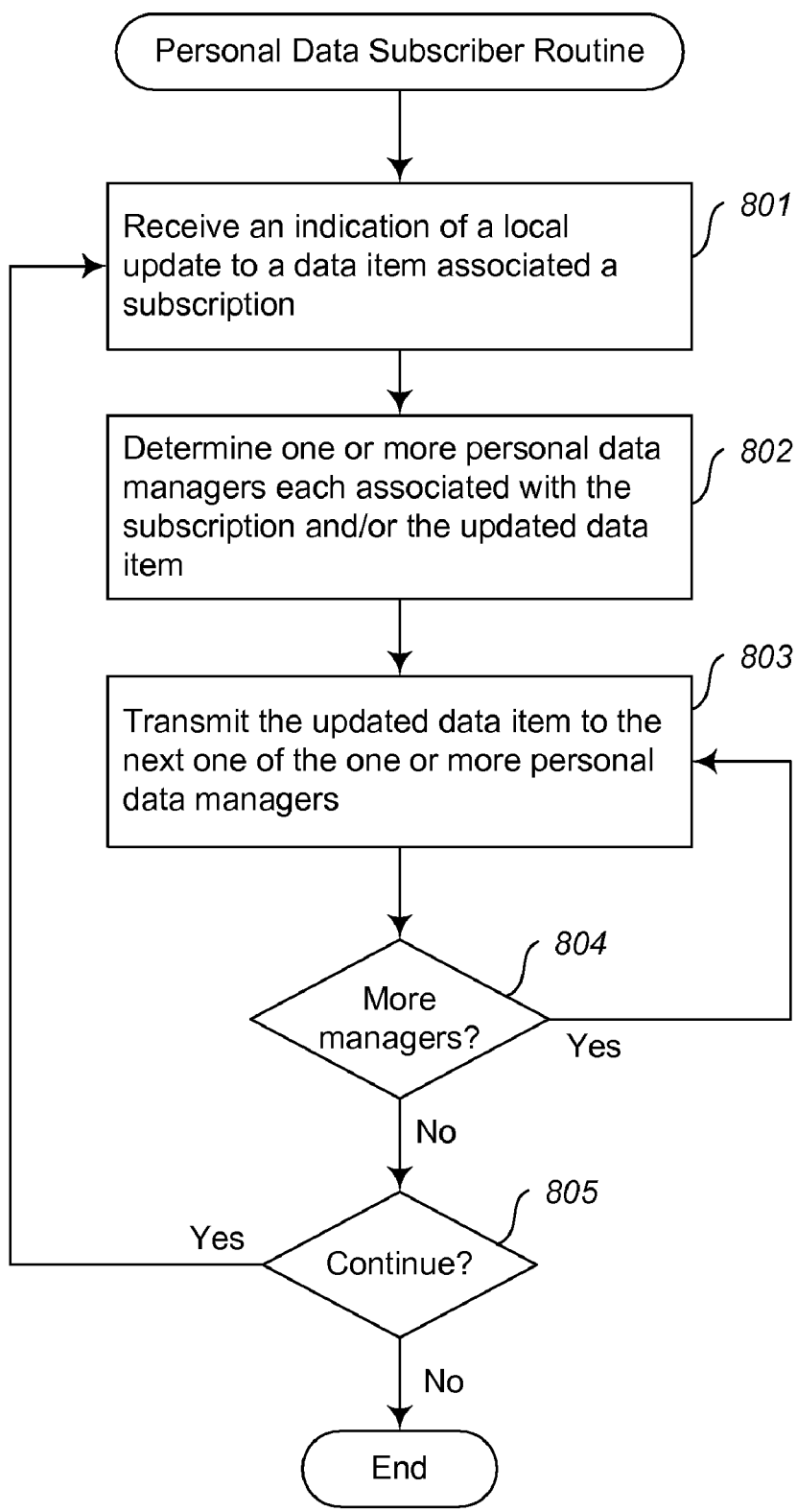
FIG. 8 is an example flow diagram of a second example personal data subscriber routine provided by an example embodiment of a Personal Data Subscriber.

FIG. 8 is an example flow diagram of a second example personal data subscriber routine provided by an example embodiment of a Personal Data Subscriber. The illustrated routine may be performed by the PDS 106, described with reference to FIG. 1 to facilitate the propagation of personal data. The illustrated process demonstrates the propagation of personal data between a personal data subscriber and a personal data manager, by transmitting updated data from the personal data subscriber to one or more personal data managers, for storage as personal data items on the one or more personal data managers, as described with reference to FIGS. 2C-2K, above.

More specifically, in steps 801-805, the routine performs a loop in which it repeatedly receives an indication of a local update to a data item associated with a subscription and transmits the updated data item to one or more personal data managers, for storage as a personal data item by those personal data managers on respective secure personal data stores. In particular, in step 801, the routine receives an indication of a local update to a data item associated with a subscription. Typically, the updated data item may be stored at or associated with the personal data subscriber. For example, the updated data item may be stored in a data store associated with or coupled to the PDS 106. Furthermore, the updated data item may include information about the personal data subscriber associated with a subscription, such as contact information, customer service telephone number, hours of operation, Web site address, etc. The updated data item may also include information about a user associated with a personal data manager, such as an account balance (e.g., that has changed due to an automatic debit transaction, interest payment). The update indication may be received in various ways, such as by event notification (e.g., that a database record has been modified), procedure call (e.g., that is invoked by an application that has modified a database record), etc. The indication typically includes an indication of which data item has been updated.

In step 802, the routine determines one or more personal data managers that are each associated with the subscription and/or the updated data item. This determination may be made in an online manner, such as by requesting that the personal data propagation service provide a list of one or more personal data managers that are associated with the subscription. In other embodiments, this determination may be made in an offline manner, by utilizing cached or otherwise previously stored information about personal data managers and their associated subscriptions. As noted above, the updated data item may be specific to a particular set of personal data managers. For example, if the updated personal data item is an account balance, it is typically associated with a single personal data manager, or only personal data managers associated with the account.

In step 803, the routine transmits the updated data item to the next one of the one or more personal data managers determined in step 802. By transmitting the updated data item to a personal data manager, the routine causes the personal data manager to store the updated data item as a personal data item in a secure personal data store coupled to the personal data manager. Of course, the personal data manager receiving the updated data item may elect not to store the updated data item when such storage is not in accordance with a subscription. In a typical embodiment, the communication link between the personal data subscriber and the personal data manager is itself encrypted, so as to prevent eavesdropping and/or interception of data items. In at least some cases, a personal data manager may be unreachable (e.g., offline). In such situations, the personal data subscriber may record (e.g., cache) an indication that the update failed, so that it can be attempted at a later time, or combined with a later update.

In step 804, the routine determines if there are more personal data managers to which to transmit the updated data item, and if so, proceeds to step 803 and continues the loop of step 803-804, else proceeds to step 805. In step 805, the routine determines whether to continue, and if so, continues the loop of steps 801-805, else ends.

Note that although this routine has been described as propagating a single updated data item at a time, other embodiments may propagate multiple updated data items, if any, at a time. For example, for each personal data manager, the personal data subscriber could transmit all updated data items (e.g., in a single message) that are relevant to the personal data manager.

Figure 9:
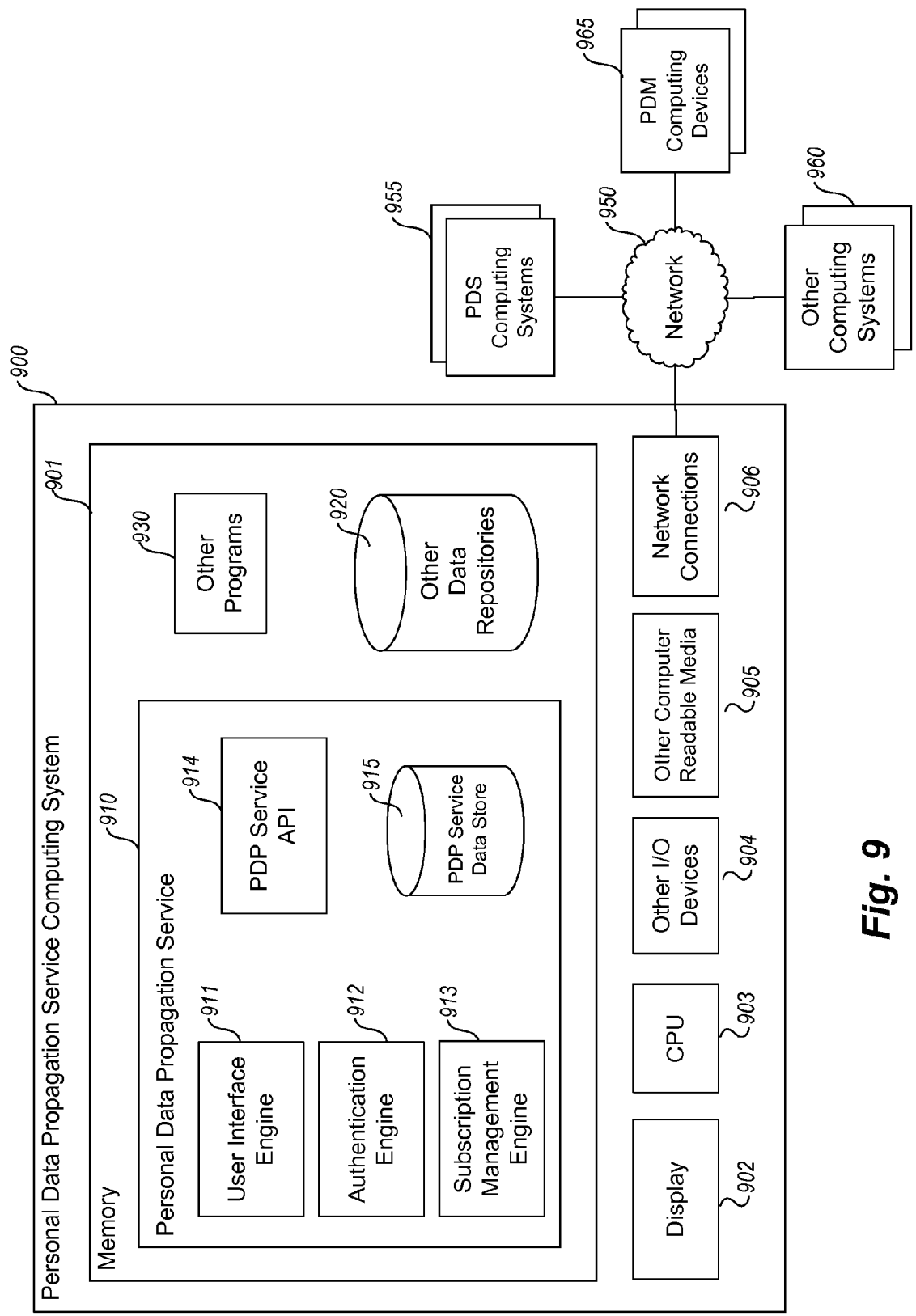
FIG. 9 is an example block diagram of a computing system for practicing embodiments of a Personal Data Propagation Service.

FIG. 9 is an example block diagram of a computing system for practicing embodiments of a Personal Data Propagation Service. Note that a specifically programmed general purpose computing system or a special purpose computing system may be used to implement a Personal Data Propagation Service ("PDP service"). Further, the PDP service may be implemented in software, hardware, firmware, or in some combination to achieve the capabilities described herein.

The computing system 900 may comprise one or more server and/or client computing systems and may span distributed locations. In addition, each block shown may represent one or more such blocks as appropriate to a specific embodiment or may be combined with other blocks. Moreover, the various blocks of the PDP service 910 may physically reside on one or more machines, which use standard (e.g., TCP/IP) or proprietary interprocess communication mechanisms to communicate with each other.

In the embodiment shown, computer system 900 comprises a computer memory ("memory") 901, a display 902, one or more Central Processing Units ("CPU") 903, Input/Output devices 904 (e.g., keyboard, mouse, CRT or LCD display), other computer-readable media 905, and network connections 906. The PDP service 910 is shown residing in memory 901. In other embodiments, some portion of the contents and some or all of the components of the PDP service 910 may be stored on and/or transmitted over the other computer-readable media 905. The components of the PDP service 910 preferably execute on one or more CPUs 903 and manage the storage and propagation of personal data items, as described herein. Other code or programs 930 (e.g., a Web server) and potentially other data repositories, such as data repository 920, also reside in the memory 901 and preferably execute on one or more CPUs 903. Of note, one or more of the components in FIG. 9 may not be present in any specific implementation. For example, some embodiments embedded in other software may not provide means for user input or display.

In a typical embodiment, the PDP service 910 includes a user interface engine 911, an authentication engine 912, a subscription management engine 913, a personal data propagation service application program interface ("PDPS API") 914, and one or more personal data propagation service data stores 915. Other and/or different modules may be implemented. In addition, the PDP service 910 may interact via a network 950 with personal data subscriber computing systems 955, personal data manager computing devices 965, and other computing systems 960. Also, the one or more personal data propagation service data stores 915 may be provided external to the PDP service 910 as well, for example via one of the other computer readable media 905.

The user interface engine 911 provides a view and a controller that facilitate user interaction with the PDP service 910. The user interface engine 911 may, for example, provide an interactive graphical user interface (e.g., a "dashboard") that may be used by a user (e.g., a service administrator) to manage the operation of the PDP service 910. Such a graphical user interface may provide functions for creating, updating, deleting, managing, forwarding, and otherwise manipulating the various kinds of personal data subscriptions that are available via the PDP service 910. In addition, the user interface 911 may provide functions for managing information about the various personal data subscribers and/or personal data managers that utilize the PDP service 910 (e.g., subscriber accounts, associations between subscribers and subscriptions, associations between subscribers and personal data managers).

The authentication engine 912 provides functions for authenticating or otherwise establishing the identity of the various components and/or systems that utilize the PDP service 910. For example, the authentication engine 912 may, during the course of a personal data propagation, authenticate one of the PDM computing devices 965 to one of the PDS computing systems 955, and vice versa. Various known and/or proprietary authentication techniques are contemplated, including the use of digital certificates, password-oriented approaches (e.g., one-time passwords, PIN numbers), challenge-response architectures, multi-factor authentication (e.g., utilizing biometrics), etc.

The subscription management engine 913 manages personal data subscriptions. Managing personal data subscriptions may include providing information about personal data subscriptions (e.g., what types of personal data are accessible using a particular subscription, which subscribers are associated with a particular subscription); associating personal data subscriptions with personal data subscribers; and creating, updating, deleting, forwarding, and otherwise manipulating personal data subscriptions. For example, the PDS computing systems 955 may interact with the subscription management engine 913 in order to obtain new subscriptions and/or modify/delete existing subscriptions. In addition, the PDM computing devices 965 may interact with the subscription management engine to determine whether a particular personal data subscriber is associated with a subscription that entitles access to a specified personal data item. Furthermore, a PDP service administrator user may interact with the subscription management engine 913 to create new types of subscriptions. Such interactions may occur directly or indirectly (e.g., via the PDPS API 914).

The PDPS API 914 provides programmatic access to one or more functions of the PDP service 910. For example, the PDPS API 914 may provide an interface to access one or more functions that may be invoked by a payment processing system executing as one of the other programs 930 in order to obtain information about subscriptions managed by the PDP service 910 in an automated or semi-automated manner. The example payment processing system may then utilize this information to, for example, generate billing statements or otherwise process payments from personal data subscribers that utilize the PDP service 910. In addition, the PDPS API 914 may be in at least some embodiments invoked or otherwise accessed via remote entities, such as the PDP service computing system 955 and/or the PDM computing devices 965, to access various functionality of the PDP service 910. For example, the one or more PDM computing devices 965 may utilize (e.g., call, invoke, execute) functions of the PDPS API 914 to determine whether a specified personal data subscriber is entitled to access a particular personal data item.

The one or more PDP service data stores 915 record information related to subscriptions offered and managed by the PDP service 910. Such information may include the details of various subscriptions, such as, for each subscription, a subscription name, the types of personal data accessible in accordance with the subscription, a price associated with the use of the subscription, subscription version information, etc. In addition, the one or more PDP service data stores 915 will typically maintain associations between personal data subscribers and personal data subscriptions. Information about each personal data manager and/or personal data subscriber may also be maintained in the one or more data stores 915, such as identity information (e.g., device identifiers for secure personal data stores, unique identifiers associated with personal data subscribers and/or managers) and/or billing information (e.g., to charge personal data subscribers for use of the service). The PDP service data stores 915 may also include code modules that implement personal data subscribers and/or personal data managers, such that these code modules may be distributed electronically via the PDP service 910.

In an example embodiment, components/modules of the PDM 310 of FIG. 3, the PDS 610 of FIG. 6, and/or the PDP service 910 of FIG. 9 are implemented using standard programming techniques. For example, the PDM 310, the PDS 610, and/or the PDP service 910 may each be implemented as "native" executables running on the corresponding illustrated CPUs 303, 603, and 903, along with one or more static or dynamic libraries. In other embodiments, the PDM 310, the PDS 610, and/or the PDP service 910 may each be implemented as instructions processed by a corresponding virtual machine that executes as one of the corresponding other programs 330, 630, and 930. In general, a range of programming languages known in the art may be employed for implementing such example embodiments, including representative implementations of various programming language paradigms, including but not limited to object-oriented (e.g., Java, C++, C#, Smalltalk), functional (e.g., ML, Lisp, Scheme), procedural (e.g., C, Pascal, Ada, Modula), scripting (e.g., Perl, Ruby, Python, JavaScript, VBScript), declarative (e.g., SQL, Prolog), etc.

The embodiments described above may also use well-known or proprietary synchronous or asynchronous client-sever computing techniques. However, the various components may be implemented using more monolithic programming techniques as well, for example, as an executable running on a single CPU computer system, or alternately decomposed using a variety of structuring techniques known in the art, including but not limited to multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by various implementations. Also, other steps could be implemented for each routine, and in different orders, and in different routines, yet still achieve the functions of a PDM, PDS, and/or PDP service.

In addition, programming interfaces to the data stored as part of the PDM 310 (e.g., in the one or more secure personal data stores 315), the PDS 610, and the PDP service 910 can be available by standard means such as through C, C++, C#, and Java APIs; libraries for accessing files, databases, or other data repositories; through scripting languages such as XML; or through Web servers, FTP servers, or other types of servers providing access to stored data. The illustrated data stores of FIGS. 3, 6, and 9 (e.g., the one or more secure personal data stores 315) may be implemented as one or more database systems, file systems, or any other method known in the art for storing such information, or any combination of the above, including implementation using distributed computing techniques (e.g., client server programming, utility computing, cloud computing).

Also the example PDM 310 of FIG. 3, PDS 610 of FIG. 6, and/or PDP service 910 of FIG. 9 may be implemented in a distributed environment comprising multiple, even heterogeneous, computer systems and networks. For example, in one embodiment of a PDM, the user interface engine 311, the personal data propagation engine 312, the PDM API 313, and the one or more secure personal data stores 315 are all located in physically different computer systems. In another embodiment, various modules of the PDM 310 are hosted each on a separate server machine and may be remotely located from the tables which are stored in the one or more secure personal data stores 315. Also, one or more of the modules may themselves be distributed, pooled or otherwise grouped, such as for load balancing, reliability or security reasons. Different configurations and locations of programs and data are contemplated for use with techniques described herein. A variety of distributed computing techniques are appropriate for implementing the components of the illustrated embodiments in a distributed manner, including but not limited to TCP/IP sockets, RPC, RMI, HTTP, Web Services (XML-RPC, JAX-RPC, SOAP, etc.). Other variations are possible. Also, other functionality could be provided by each component/module, or existing functionality could be distributed amongst the components/modules in different ways, yet still achieve the functions of a PDM, PDS, and/or PDP service.

Furthermore, in some embodiments, some or all of the components of the illustrated PDM 310 of FIG. 3, PDS 610 of FIG. 6, and PDP service 910 of FIG. 9 may be implemented or provided in other manners, such as at least partially in firmware and/or hardware, including but not limited to one or more application-specific integrated circuits (ASICs), standard integrated circuits, controllers (e.g., by executing appropriate instructions and including microcontrollers and/or embedded controllers), field-programmable gate arrays (FPGAs), complex programmable logic devices (CPLDs), etc. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 10:
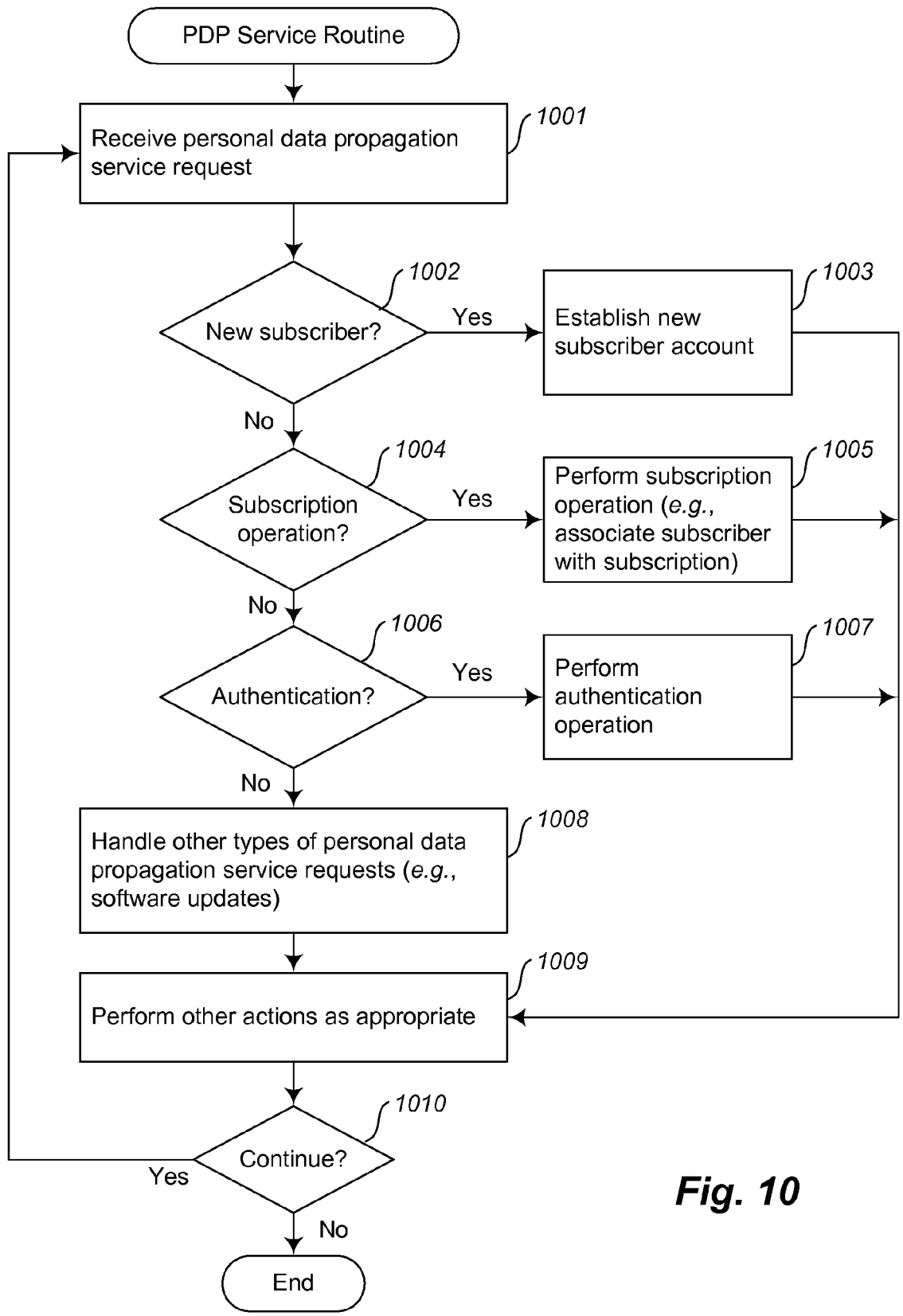
FIG. 10 is an example flow diagram of an example personal data propagation service routine provided by an example embodiment of a Personal Data Propagation Service.

FIG. 10 is an example flow diagram of an example personal data propagation service routine provided by an example embodiment of a Personal Data Propagation Service. The illustrated routine may be performed by the PDP service 101, described with reference to FIG. 1 to facilitate the propagation of personal data. The illustrated process demonstrates various service-related functions such as subscriber account management, subscription-related operations, and authentication.

More specifically, in steps 1001-1010, the routine performs a loop in which it repeatedly receives and processes personal data propagation service requests. In particular, in step 1001 the routine receives a personal data propagation service request. Such a request may be received from a personal data manager, a personal data subscriber, a local user interface component, a local or remote third-party application (e.g., a payment processing engine), etc.

In step 1002, the routine determines whether the request was to create a new personal data subscriber account, and if so, proceeds to step 1003, else proceeds to step 1004. In step 1003, the routine establishes a new personal data subscriber account. Such an account may identify an entity (e.g., a company, person) that operates the personal data subscriber, such that that entity may be charged a fee for utilizing the PDP service. Establishing an account may also include distributing code modules for installation on a remote personal data subscriber computing system. The routine then proceeds to step 1009.

In step 1004, the routine determines whether the request was a subscription-related operation, and if so, proceeds to step 1005, else proceeds to step 1006. In step 1005, the routine performs the requested subscription-related operation. Subscription-related operations may include, for example, managing associations between subscribers and subscriptions, such as associating a specified personal data subscriber with a specified subscription, disassociating a subscriber from a subscription, etc. Subscription-related operations may also include providing information about existing subscriptions, such as which subscribers are associated with a specified subscription, whether a particular subscription entitles access to a specified personal data item, which personal data managers are associated with a specified subscription and/or personal data subscriber, etc. For example, the routine may receive a request from a personal data manager that asks whether a personal data subscriber is entitled to access a particular personal data item. In response, the routine may determine whether the personal data subscriber is associated with at least one subscription that includes the particular personal data item, and respond to the personal data manager with its determination. The routine then proceeds to step 1009.

In step 1006, the routine determines whether the request was an authentication request, and if so, proceeds to step 1007, else proceeds to step 1008. In step 1007, the routine performs the requested authentication operation. In the illustrated embodiment, the routine may assist in the authentication of a personal data subscriber to a personal data manager, and vice versa. In some embodiments, the routine may operate as a certificate authority, by issuing certificates that personal data subscribers and/or managers may utilize to establish their identity to one another.

In other embodiments, other authentication techniques may be utilized instead or in addition. For example, a two-way challenge-response scheme may be implemented in which a personal data subscriber and a personal data manager are each provided with a correct response to a challenge received from the other device/system. In some embodiments, the personal data subscriber and the personal data manager are each provided with matching first and second "secrets," such that the personal data subscriber can communicate the first secret to the personal data manager for verification, and the personal data manager can communicate the second secret to the personal data subscriber for verification. In this manner, the personal data subscriber and the personal data manager may authenticate themselves to one another. In some embodiments, the secret may be or include a large, randomly generated number.

Note that in some embodiments, interactions between the personal data subscriber and the personal data manager may be effectively anonymous. In the two-way challenge response scheme described above, the personal data manager and personal data subscriber authenticate one another by replying with the correct response ("secret") in the face of a provided challenge. Because the secrets are distributed by the PDP service, the PDP service may effectively hide the identities of the personal data manager and the personal data subscriber from one another. In exchanging secrets, the personal data manager and subscriber may learn only that the other party is in possession of the correct secret and should therefore be trusted, without learning more about the identity of the other party. The routine then proceeds to step 1009.

In step 1008, the routine handles other types of personal data propagation service requests. Other types of requests may include, for example, requests for information about the operation of the service (e.g., for diagnostic purposes, for payment processing purposes), requests to distribute software and/or software updates to personal data managers and/or personal data subscribers, etc. In some embodiments, the personal data propagation service may also initiate the distribution of secure personal data stores. For example, the personal data propagation service may, possibly on behalf of a personal data subscriber, distribute secure personal data stores (e.g., in the form of keychain memory devices, smart cards) to customers of the personal data subscriber, so as to encourage those customers to utilize the personal data propagation service. The personal data propagation service may then associate a unique identifier associated with each distributed secure personal data store with a particular customer and/or personal data subscriber.

In step 1009, the routine performs other actions as appropriate. Such actions may be related to the received request, such as logging details of the processed request (e.g., the type of request processed, the time of the request), generating entries in an error log or otherwise handling error conditions (e.g., when the request could not be processed), etc. In addition, some actions may be periodically performed, such as periodically notifying personal data managers of changes to subscriptions and associated subscribers, periodically initiating billing transactions for personal data subscribers and/or managers, etc.

In step 1010, the routine determines whether to continue, and if so, continues with the loop of steps 1001-1010, else ends.

Table 1, below, describes various types of personal data items that may be represented and propagated in some embodiments. In the example of Table 1, personal data items are organized into categories. Some embodiments may utilize various constructs (e.g., categories, types, classes, groups) to organize personal data items for the convenience of users, personal data subscribers, and/or managers. In at least some embodiments, such organizational constructs may be user defined and/or configurable. Other embodiments do not provide or utilize any organizational constructs.

TABLE 1

| Category | Personal Data Item | Description/Examples |
|---|---|---|
| Identity | Name | (e.g., given, middle, and family name(s)) |
| | Address | (e.g., current and/or past postal addresses for home, work, vacation) |
| | Phone Number | (e.g., current and/or past telephone numbers) |
| | E-mail Address | |
| | Photograph | A digital image (e.g., a JPEG) |
| | Government Identifier | (e.g., social security number, tax identifier) |

TABLE 1-continued

| Category | Personal Data Item | Description/Examples |
|---|---|---|
| Financial | Bank Information | (e.g., routing number, account number) |
| | Credit Card Information | (e.g., issuer name, expiration date, card number) |
| | Debit Card Information | (e.g., issuer name, expiration date, card number) |
| | Payment Processor Information | Third-party payment processor (e.g., PayPal) information (e.g., account name/number) |
| | Credit/Debit Balance | Current balance associated with one or more payment mechanisms (e.g., debit transactions, e-cash transactions) |
| Sensitive | Race | |
| | Gender | |
| | Sexual Orientation | |
| | Criminal Record | |
| | Income Class | Social profile |
| Professional | Curriculum Vitae | Employment history |
| | Business Card | A collection of other personal data items that may be grouped for business or personal exchange purposes |
| | Affiliations | Links to contacts, friends, social and/or professional networks, etc. |
| | Employment | Information about current and past employers, such as name, address, etc. |
| | Memberships | Memberships in professional organizations, such as unions, clubs, licensing organizations, etc. |
| | Online Profile | User ID for professional networking sites |
| Lifestyle | Hobbies | Favorite activities |
| | Sports | Favorite sporting activities and/or sports teams |
| | Media | Favorite books, movies, songs, etc. |
| Transport | Vehicle Identifier | Identifying information related to cars, boats, bicycles, airplanes, etc. |
| | Vehicle Technical Attributes | Make, model, year, chassis number, etc. |
| Preferences | Food Allergy | (e.g., peanut allergy, lactose intolerance) |
| | Food Preference | (e.g., vegetarian, vegan, low sodium) |
| | Seating Preference | (e.g., window, aisle) |
| | Smoking Preference | (e.g., smoking, non-smoker) |
| | Disabled Access | (e.g., wheel chair access required) |
| Relationships | Spouse/Partner | Identification of spouse or domestic partner |
| | Dependent | Identification of child or other dependent |
| | Colleague | Identification of co-worker |
| | Genealogy | Information related to ancestry (e.g., parents) |
| Web/Internet | Internet History | (e.g., URLs of Web sites recently visited) |
| | Internet Bookmarks | (e.g., URLs to favorite Web sites and associated user/community ratings) |
| | Social Network | (e.g., social network user ID, contacts/connections) |
| | VOIP | (e.g., user ID) |
| | Instant Messaging | (e.g., user ID) |
| | Cookies | |
| | Encryption Information | (e.g., public/private keys, certificate authorities) |
| Data Protection | Consent | Per-subscriber user consent that has been previously obtained and stored |
| | Default Consent Level | Global user consent option used as a default |
| | Third-party Consent | Includes references to entities outside the scope of the PDP Environment |
| Contact Preferences | | Preferred communication mechanisms stored on a per-subscriber basis |
| | E-mail | Opt-in/out selection(s) |
| | Telephone | Opt-in/out selection(s) |
| | Postal Mail | Opt-in/out selection(s) |
| | Fax | Opt-in/out selection(s) |
| Coupons/Offers (Marketing) | Discount Coupon | Information related to a discount received or offered from a personal data subscriber |
| | Offer Coupon | Information related to an offer received from a personal data subscriber |

TABLE 1-continued

| Category | Personal Data Item | Description/Examples |
|---|---|---|
| Synthetic Ratings | Transaction History Rating Aggregated Statistical Rating | (e.g., member since date, computed loyalty ratings, financial strength rating) (e.g., data that is shared with a community and/or third parties that is not directly linked to the user or personal data manager) |
| Personal Data Subscribers | PDS Information | Identifiers (e.g., IP address, URL) associated with PDS |
|  | Per PDS data structure | Used to store PDS data within the secure personal data store |

Personal data items may be represented in a variety of ways. For example, in one embodiment, a data representation language (e.g., XML) may be used to express personal data items in a machine-readable manner. In another embodiment, a personal data item may be represented in a relational database, as defined by a database schema. Note also that some personal data items may be aggregates of multiple "atomic" personal data items. For example, a business card personal data item may include name, business address, email address, and business phone. Personal data items may also be or include links and/or references to other personal data items. For example, the business card personal data item may include a reference to a current employer address, such that if the current employer's address changes, the business card personal data item can be automatically updated. As another example, a car insurance personal data item may include name of the insured, insurance policy number, insurer identification, and vehicle information (e.g., vehicle identification number, make, model). Each personal data item may have associated attributes, such as type, permissions (e.g., read, write, read/write, execute), size (e.g., maximum number of characters), etc.

Each of the above U.S. patents, U.S. patent application publications, U.S. patent applications, foreign patents, foreign patent applications and non-patent publications listed in the Application Data Sheet and/or referred to in this specification, including co-pending applications entitled "METHODS AND SYSTEMS FOR FACILITATING PERSONAL DATA PROPAGATION," application Ser. No. 12/356,501 (U.S. Patent Application Publication No. 2010/0186066), filed Jan. 20, 2009; and "PERSONAL DATA SUBSCRIBER SYSTEMS AND METHODS," application Ser. No. 12/356, 503 (U.S. Patent Application Publication No. 2010/0185546), filed Jan. 20, 2009, are incorporated herein by reference, in their entireties.

From the foregoing it will be appreciated that, although specific embodiments have been described herein for purposes of illustration, various modifications may be made without deviating from the spirit and scope of the present disclosure. For example, the methods and systems for facilitating personal data propagation discussed herein are applicable to other architectures other than a personal data context. For example, data propagation may be used to automatically update and/or exchange information between communication software systems, such as configuration data, device data, software version information, etc. Also, the methods and systems discussed herein are applicable to differing communication protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A personal data manager computing device configured to facilitate propagation of personal data, the personal data manager computing device comprising:
   a memory;
   a secure data store; and
   a personal data manager module stored on the memory and configured, when executed by the personal data manager computing device, to:
   receive from a personal data subscriber computing system a request for one or more personal data items stored in the secure data store;
   determine whether the request for the one or more personal data items is in accord with a personal data subscription data structure associated with the personal data subscriber computing system, the personal data subscription data structure including indicators of a plurality of personal data items and entitling the personal data subscriber computing system to access the plurality of personal data items from the secure data store, wherein the personal data subscription data structure includes an indication of a category of personal data items, the category indicating at least one of address information, credit card information, and bank account information; and
   when the request for the one or more personal data items is determined in accord with the personal data subscription data structure, cause the personal data subscriber computing system to initiate a transaction by initiating transmission of the one or more requested personal data items to the personal data subscriber computing system,
   wherein the personal data manager computing device is a personal computing device of a user and the one or more requested personal data items represent personal information about the user,
   wherein the personal data manager module determines whether the request is in accord with the personal data subscription data structure based upon a first indication received from a remote personal data propagation service computing system that the one or more requested personal data items is one of the plurality of personal data items to which the personal data subscription data structure entitles access, the personal data propagation service having stored an association of an identifier of the personal data subscriber computing system with the personal data subscription data structure, and
   wherein the personal data manager computing device, the personal data subscriber computing system, and the personal data propagation service computing system are distinct and remote from one another.

2. The personal data manager computing device of claim 1 wherein the one or more personal data items are stored in encrypted form on the secure data store.

3. The personal data manager computing device of claim 1 wherein the secure data store is removably coupled to the personal data manager computing device.

4. The personal data manager computing device of claim 1 wherein the secure data store includes a plurality of data items that include at least one of a personal name, an address, financial information, a user name, a password, a government identifier, a communication preference, and contact information.

5. The personal data manager computing device of claim 1 wherein the personal data manager module is further configured, when executed by the personal data manager computing device, to:
receive a second indication that one or more personal data items have been modified on the secure data store; and
in response to the received second indication, automatically propagate the one or more modified personal data items to the personal data subscriber computing system, based at least in part on whether one of the one or more modified personal data items is one of the plurality of personal data items to which the personal data subscription data structure entitles access.

6. The personal data manager computing device of claim 1 wherein the personal data subscriber computing system is operated by an electronic commerce entity.

7. The personal data manager computing device of claim 1 wherein the personal data manager module includes instructions configured for execution by the personal data manager computing device.

8. The personal data manager computing device of claim 1 wherein the personal data manager module is further configured, when executed by the personal data manager computing device, to provide a user interface that is configured, when executed, to create, update, or delete personal data items stored on the secure data store.

9. A non-transitory computer-readable storage medium including non-transitory contents including instructions that, when executed by a personal data manager computing device, cause the personal data manager computing device to facilitate propagation of personal data, by performing a method comprising:
receiving from a personal data subscriber computing system a request for one or more personal data items stored in a secure data store communicatively coupled to the personal data manager computing device;
determining whether the request for the one or more personal data items is in accord with a personal data subscription data structure associated with the personal data subscriber computing system, the personal data subscription data structure including indicators of a plurality of personal data items and entitling the personal data subscriber computing system to access the plurality of personal data items from the secure data store, wherein the personal data subscription data structure includes an indication of a category of personal data items, the category indicating at least one of address information, credit card information, and bank account information; and
when the request for the one or more personal data items is determined to be in accord with the personal data subscription data structure, causing the personal data subscriber computing system to initiate a transaction by initiating transmission of the one or more requested personal data items to the personal data subscriber computing system,
wherein the personal data manager computing device is a personal computing device of a user and the one or more requested personal data items represent personal information about the user,
wherein determining whether the request is in accord with the personal data subscription data structure is based upon a first indication received from a remote personal data propagation service computing system that the one or more requested personal data items is one of the plurality of personal data items to which the personal data subscription data structure entitles access, the personal data propagation service having stored an association of an identifier of the personal data subscriber computing system with the personal data subscription data structure, and
wherein the personal data manager computing device, the personal data subscriber computing system, and the personal data propagation service computing system are distinct and remote from one another.

10. The computer-readable storage medium of claim 9 wherein the method further comprises obtaining from the user associated with the personal data manager computing device consent to provide the one or more requested personal data items to the personal data subscriber computing system.

11. The computer-readable storage medium of claim 10 wherein obtaining from the user consent to provide the one or more requested personal data items to the personal data subscriber includes interactively prompting the user for the consent to provide the one or more personal data items to the personal data subscriber computing system.

12. The computer-readable storage medium of claim 9 wherein determining whether the request for the one or more personal data items is in accord with the personal data subscription data structure includes determining, from a local cache, information regarding whether at least one of the one or more requested personal data items is one of the plurality of personal data items to which the personal data subscription data structure entitles access.

13. The computer-readable storage medium of claim 9 wherein determining whether the request for the one or more personal data items is in accord with the personal data subscription data structure includes requesting from a remote personal data propagation service an indication that the one or more requested personal data items is one of the plurality of personal data items to which the personal data subscription data structure entitles access.

14. The computer-readable storage medium of claim 9 wherein the method further comprises automatically populating a user interface display with the one or more requested personal data items prior to initiating transmission of the one or more personal data items to the personal data subscriber computing system.

15. The computer-readable storage medium of claim 9 wherein the method further comprises receiving a data item from the personal data subscriber computing system and storing the received data item as a personal data item on the secure data store.

16. The computer-readable storage medium of claim 9 wherein the personal data manager computing device is at least one of a desktop computer system, a portable computer system, a mobile phone, a smart phone, and a personal digital assistant.

17. The computer-readable storage medium of claim 9 wherein the computer-readable storage medium is included in at least one of a memory stick, a memory card, a disk, and an input device.

18. The computer-readable storage medium of claim 9 wherein the method further comprises:
receiving a second indication that one or more personal data items have been modified on the secure data store; and
in response to the received second indication, automatically propagating the one or more modified personal data items to the personal data subscriber computing system, based at least in part on one of the one or more modified personal data items being one of the plurality of personal data items to which the personal data subscription data structure entitles access.

19. A computer-implemented method in a personal data manager computing device for facilitating propagation of personal data, the method comprising:
receiving an indication of an update to a personal data item stored in a secure data store communicatively coupled to the personal data manager computing device; and
automatically propagating the updated personal data item to a personal data subscriber computing system, by:
determining that the personal data subscriber computing system is associated with a personal data subscription data structure that includes indicators of a plurality of personal data items and that entitles the personal data subscriber computing system access to the updated personal data item as one of the plurality of personal data items, wherein the personal data subscription data structure includes an indication of a category of personal data items, the category indicating at least one of address information, credit card information, and bank account information; and
automatically initiating transmission of the updated personal data item to the personal data subscriber computing system,
wherein the personal data manager computing device is a personal computing device of a user and the updated personal data item represents personal information about the user,
wherein determining that the personal data subscriber computing system is associated with a personal data subscription data structure is based upon an indication received from a remote personal data propagation service computing system that the updated personal data item is one of the plurality of personal data items to which the personal data subscription data structure entitles access, the personal data propagation service having stored an association of an identifier of the personal data subscriber computing system with the personal data subscription data structure, and
wherein the personal data manager computing device, the personal data subscriber computing system, and the personal data propagation service computing system are distinct and remote from one another.

20. The computer-implemented method of claim 19 wherein determining that the personal data subscriber computing system is associated with a personal data subscription data structure includes requesting from the remote personal data propagation service computing system an indication that the personal data subscriber computing system is associated with the personal data subscription data structure.

21. The computer-implemented method of claim 19 wherein determining that the personal data subscriber computing system is associated with the personal data subscription data structure includes receiving a request from the personal data subscriber computing system to provide the updated personal data item.

22. The computer-implemented method of claim 19, the automatically propagating the updated personal data item occurring in response to an interaction of the user with the personal data subscriber computing system, the user interaction occurring by operating the personal data manager computing device.

23. The computer-implemented method of claim 19, the automatically propagating the updated personal data item occurring in response to the received indication of the update to the personal data item and without intervening interaction from the user.

24. The computer-implemented method of claim 19, the initiating transmission of the updated personal data item to the personal data manager computing system conditioned on consent received from the user operating the secure personal data store.

25. A non-transitory computer-readable storage medium including non-transitory contents including instructions that, when executed by a personal data manager computing device, cause the personal data manager computing device to facilitate propagation of personal data, by performing a method comprising:
automatically synchronizing a modified personal data item with a personal data subscriber computing system, the modified personal data item stored in a secure data store communicatively coupled to the personal data manager computing device, by:
determining that the personal data subscriber computing system is associated with a personal data subscription data structure that includes indicators of a plurality of personal data items and that entitles the personal data subscriber computing system access to the modified personal data item as one of the plurality of personal data items, wherein the personal data subscription data structure includes an indication of a category of personal data items, the category indicating at least one of address information, credit card information, and bank account information; and
initiating transmission of the modified personal data item to the personal data subscriber computing system,
wherein the personal data manager computing device is a personal computing device of a user and the updated personal data item represents personal information about the user,
wherein determining that the personal data subscriber computing system is associated with a personal data subscription data structure is based upon an indication received from a remote personal data propagation service computing system that the updated personal data item is one of the plurality of personal data items to which the personal data subscription data structure entitles access, the personal data propagation service having stored an association of an identifier of the personal data subscriber computing system with the personal data subscription data structure, and
wherein the personal data manager computing device, the personal data subscriber computing system, and the personal data propagation service computing system are distinct and remote from one another.

26. The computer-readable storage medium of claim 25 wherein determining that the personal data subscriber computing system is associated with a personal data subscription data structure includes receiving from the remote personal data propagation service an indication that the personal data subscriber computing system is associated with the personal data subscription data structure.

27. The computer-readable storage medium of claim 25 wherein the determining that the personal data subscriber computing system is associated with the personal data subscription data structure includes receiving a request from the personal data subscriber computing system to provide the modified personal data item.

28. The computer-readable storage medium of claim 25, the automatically synchronizing the modified personal data item occurring in response to an interaction of the user with the personal data subscriber computing system, the user interaction occurring by operating the personal data manager computing device.

29. The computer-readable storage medium of claim 25, the automatically synchronizing the modified personal data item occurring in response to a received indication of a modification to the personal data item and without intervening interaction from the user.

30. The computer-readable storage medium of claim 25 wherein the personal data subscriber computing system is operated by an electronic commerce entity.

31. The computer-readable storage medium of claim 25 wherein the method further comprises providing a user interface that is configured, when executed, to create, update, or delete personal data items stored on the secure data store.

32. The computer-readable storage medium of claim 25 wherein the modified personal data item is stored in encrypted form on the secure personal data store, and wherein the method further comprises decrypting the modified personal data item prior to the transmission of the modified personal data item.

* * * * *